(12) United States Patent
Kikuzuki et al.

(10) Patent No.: US 10,582,438 B2
(45) Date of Patent: Mar. 3, 2020

(54) BASE STATION APPARATUS, WIRELESS COMMUNICATION SYSTEM AND COMMUNICATION METHOD

(71) Applicant: FUJITSU LIMITED, Kawasaki-shi, Kanagawa (JP)

(72) Inventors: Tatsuya Kikuzuki, Sodegaura (JP); Ichirou Ida, Yokohama (JP); Kazumi Kasai, Shibuya (JP); Teruhisa Ninomiya, Yokohama (JP); Eiji Matsumoto, Nishinomiya (JP); Iwamasa Yuki, Kawasaki (JP); Toshihiro Kunitake, Kawasaki (JP); Hiroki Akano, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/430,971

(22) Filed: Feb. 13, 2017

(65) Prior Publication Data

US 2017/0156100 A1    Jun. 1, 2017

Related U.S. Application Data

(63) Continuation of application No. PCT/JP2014/071649, filed on Aug. 19, 2014.

(51) Int. Cl.
*H04W 4/00* (2018.01)
*H04W 40/24* (2009.01)
(Continued)

(52) U.S. Cl.
CPC ............. *H04W 40/24* (2013.01); *H04L 43/16* (2013.01); *H04L 45/70* (2013.01); *H04W 68/02* (2013.01);
(Continued)

(58) Field of Classification Search
CPC ....... H04L 12/43; H04L 25/49; H04L 49/254; G08G 1/0967; G08G 1/16; G08G 1/017;
(Continued)

(56) References Cited

U.S. PATENT DOCUMENTS 5,818,813 A    10/1998 Saito et al.
7,190,260 B2 *    3/2007 Rast .......................... B60Q 1/44
                                                                340/467

(Continued)

FOREIGN PATENT DOCUMENTS

JP        9-135230        5/1997
JP        9-294099        11/1997
(Continued)

OTHER PUBLICATIONS

International Search Report dated Nov. 25, 2014 in corresponding International Application No. PCT/ JP2014/071649**.

(Continued)

*Primary Examiner* — Hanh N Nguyen
(74) *Attorney, Agent, or Firm* — Staas & Halsey LLP

(57) ABSTRACT

A base station apparatus includes a processor, a memory and a communication circuit. The processor is configured to set a waiting period in which a packet from a terminal device to which a connection has not been established is awaited. The memory is configured to store data that is processed by a terminal device to which a connection is established. The communication circuit is configured to, upon receiving a first packet from a communication terminal device in the waiting period, transmit to the communication terminal device a second packet containing the data and information used by the communication terminal device for establishing a connection.

11 Claims, 25 Drawing Sheets

(51) Int. Cl.
  *H04W 76/10* (2018.01)
  *H04W 68/02* (2009.01)
  *H04L 12/26* (2006.01)
  *H04L 12/721* (2013.01)
  *H04W 88/08* (2009.01)
  *H04W 84/10* (2009.01)
  *H04W 88/02* (2009.01)

(52) U.S. Cl.
  CPC ............ *H04W 76/10* (2018.02); *H04W 84/10* (2013.01); *H04W 88/02* (2013.01); *H04W 88/08* (2013.01)

(58) Field of Classification Search
  CPC ............ G08G 1/04; G06Q 40/08; G07C 5/08; H04W 4/22; H04W 88/08
  USPC ................................. 370/461, 462, 458, 459
  See application file for complete search history.

(56) References Cited

U.S. PATENT DOCUMENTS

| | | | | |
|---|---|---|---|---|
| 7,783,403 B2* | 8/2010 | Breed | ................ | B60R 21/0134 340/435 |
| 9,253,753 B2* | 2/2016 | Rubin | ................ | H04W 72/005 |
| 9,472,104 B2* | 10/2016 | Hyde | ................ | G08G 1/16 |
| 2007/0133458 A1 | 6/2007 | Chandra et al. | | |
| 2012/0082036 A1 | 4/2012 | Abedi et al. | | |
| 2012/0119902 A1 | 5/2012 | Patro et al. | | |
| 2012/0230280 A1 | 9/2012 | Chandra et al. | | |
| 2015/0327310 A1 | 11/2015 | Miura | | |

FOREIGN PATENT DOCUMENTS

| | | |
|---|---|---|
| JP | 2009-130904 | 6/2009 |
| JP | 2011-205679 | 10/2011 |
| JP | 2012-519994 | 8/2012 |
| JP | 2012-525759 | 10/2012 |
| WO | WO 2010/100446 A1 | 9/2010 |
| WO | WO 2010/126323 A2 | 11/2010 |
| WO | WO 2014/017254 A1 | 1/2014 |

OTHER PUBLICATIONS

IEEE Std 802.15.4, IEEE Standard for Local and Metropolitan Area Network—Part 15.4: Low-Rate Wireless Personal Area Networks (LR-WPANs), [online], Apr. 27, 2012, IEEE Standard Association, [searched on Jul. 29, 2014], Internet <URL: http://standards.ieee.org/findstds/standard/802.15.4g-2012.html>.

* cited by examiner

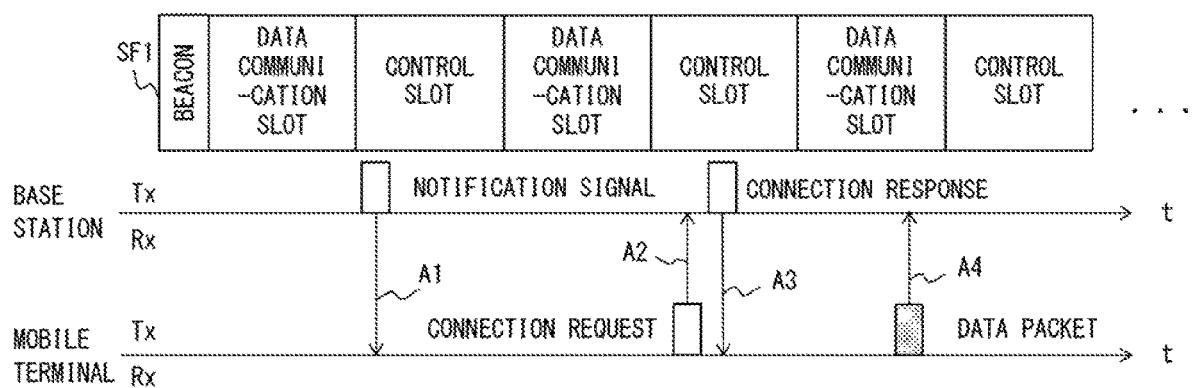
F I G. 1

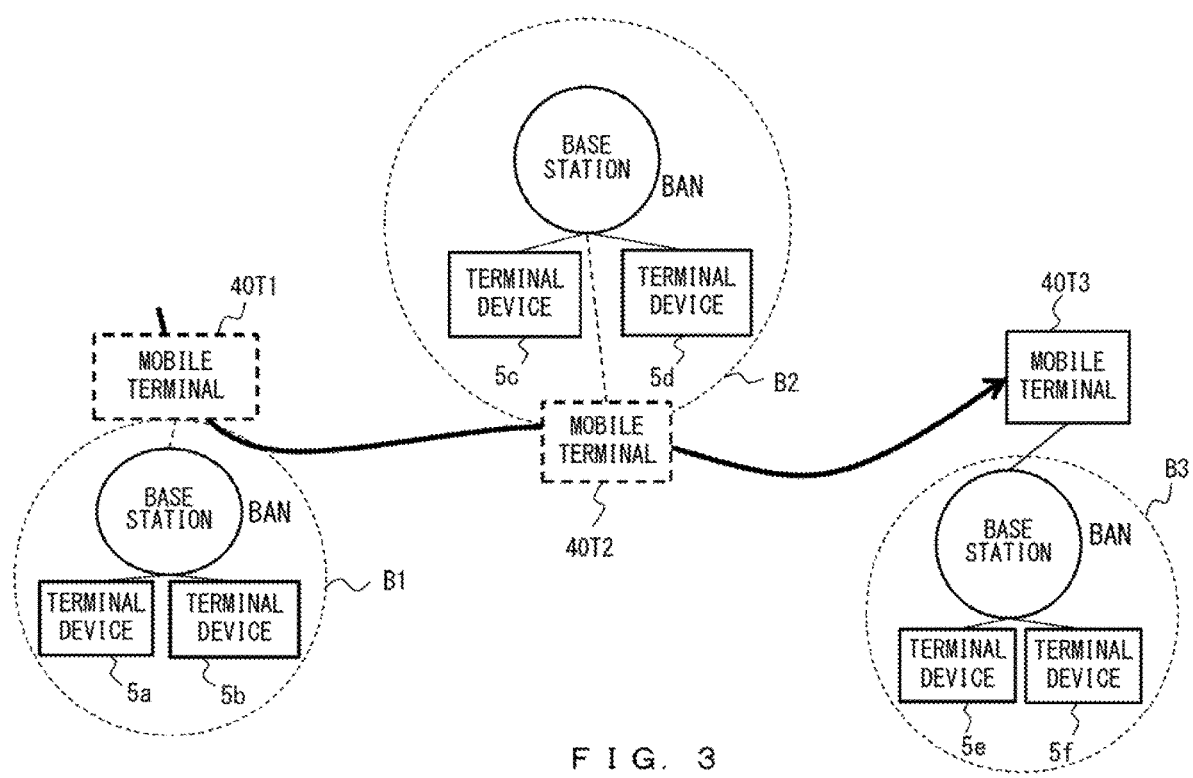
F I G. 3

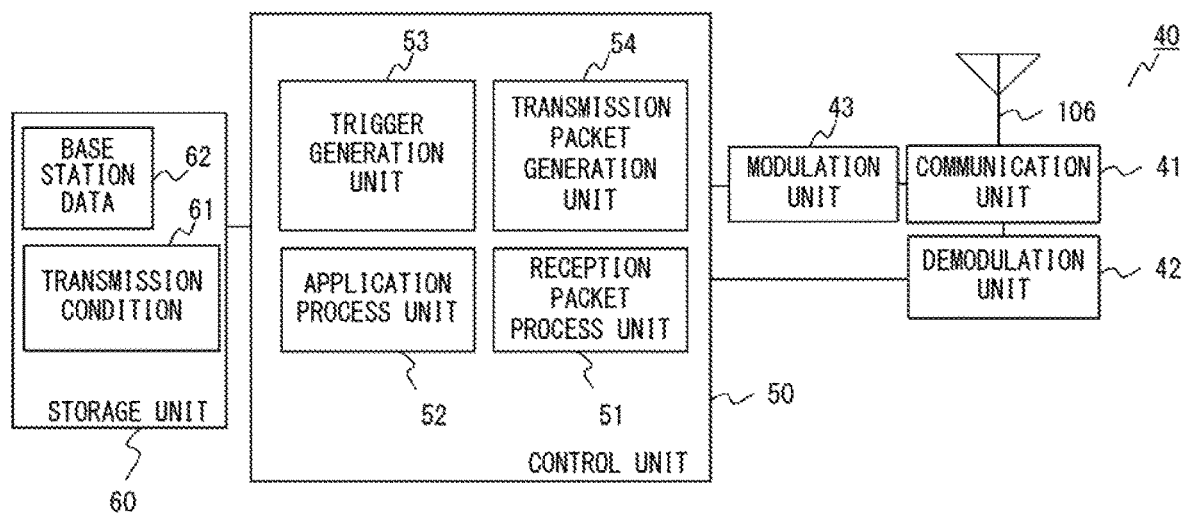
F I G. 5

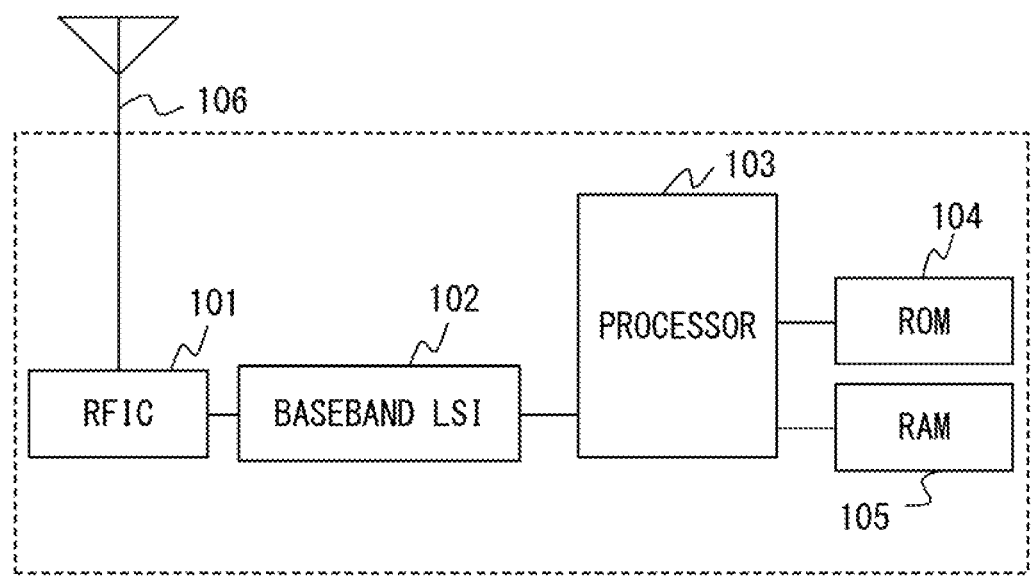
F I G. 6

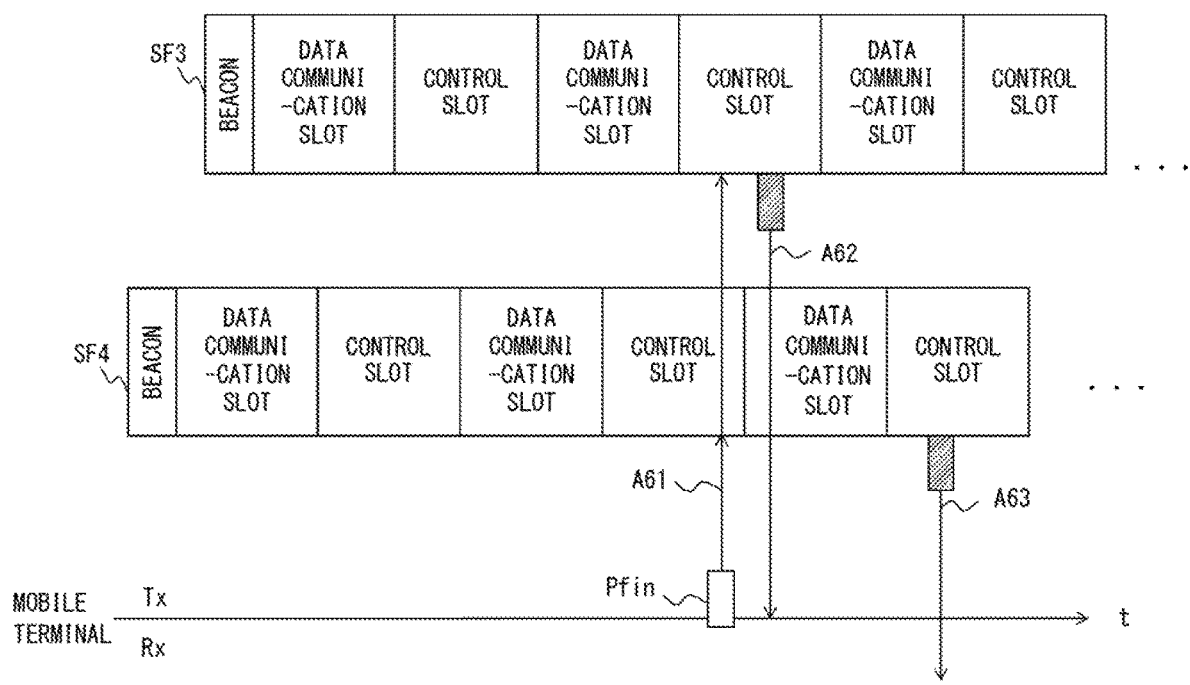
F I G. 18

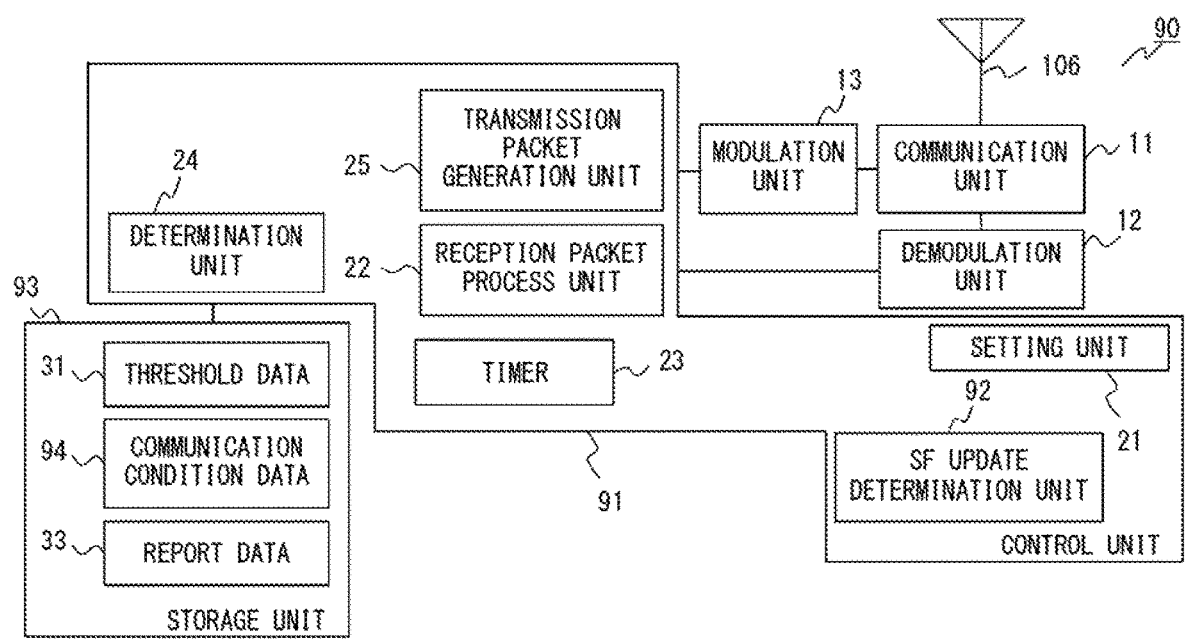
F I G. 20

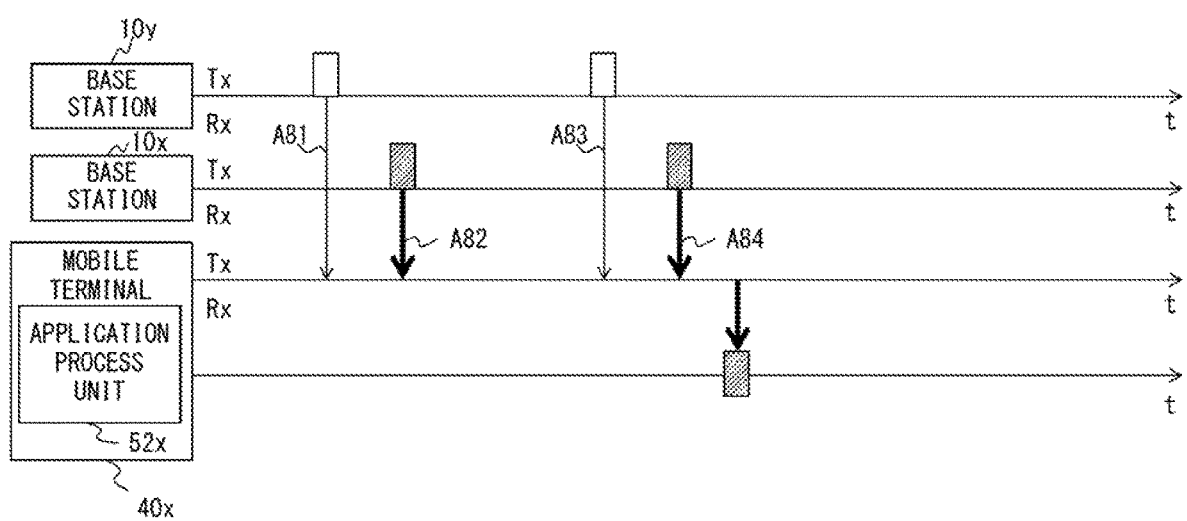
F I G. 24

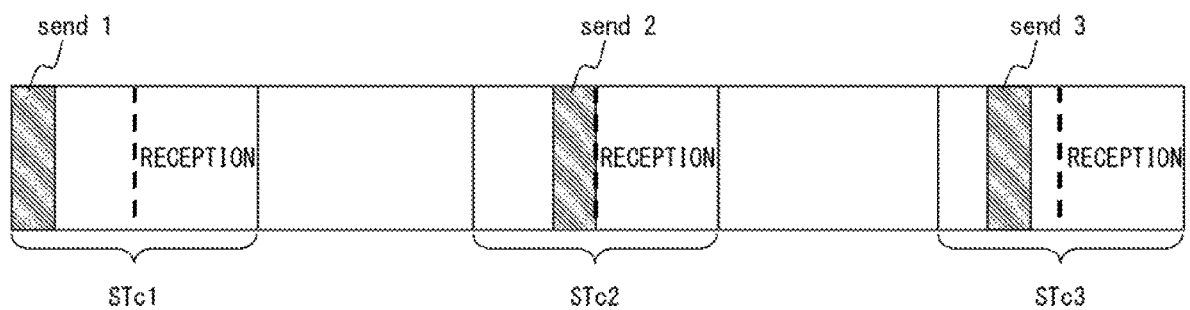
F I G. 25

BASE STATION APPARATUS, WIRELESS COMMUNICATION SYSTEM AND COMMUNICATION METHOD

CROSS-REFERENCE TO RELATED APPLICATIONS

This application is a continuation application of International Application PCT/JP2014/071649 filed on Aug. 19, 2014 and designated the U.S., the entire contents of which are incorporated herein by reference.

FIELD

The embodiments discussed herein are related to a wireless communication system having a terminal device and a base station.

BACKGROUND

A body area network (BAN) is formed by using a plurality of terminal devices that are disposed on the surface of a human body, in the body, in the vicinity of the body, or in other spots. Attempts have been made to apply BANs to medical and health care fields, to support of disabled people, to creation of electronic entertainment devices such as a game controller, and to others.

SF1 in FIG. 1 illustrates an example of a superframe used in a BAN. The superframe illustrated in FIG. 1 includes a beacon, a data communication slot and a control slot. A data communication slot is used for communications between a base station and a terminal device that has established a communication with the base station. A beacon is used by a base station for reporting a timing for a synchronization signal and for an access to a terminal device that has established a communication. A control slot is a slot that a plurality of terminal devices can access on an as-needed basis, and is used for transmitting and receiving for example a notification signal and a control packet used for establishing communications between a base station and a terminal device.

In the example illustrated in FIG. 1, a base station transmits a notification signal when each control slot starts (arrow A1). In order to generate a connection to a base station that is in a good communication condition from among base stations nearby, a terminal device selects a connection destination from among base stations from which the terminal device succeeded in receiving a notification signal within a prescribed period. Determining a base station as a connection base station, the terminal device transmits a connection request to the base station determined as a connection base station (arrow A2). Receiving the connection request, the base station sets a period of performing a communication with the terminal device as the transmission source of the connection request to a period in a data communication slot, and thereafter transmits a connection response to the terminal device as a response to the connection request (arrow A3). In this example, the connection response contains information that specifies a timing for performing a communication between the base station and the terminal device having transmitted the connection request. Accordingly, the terminal device establishes a connection to the base station by using the connection response, and thereafter transmits a data packet that is addressed to the base station during the specified period in the data communication slot specified by the base station (arrow A4). Note that while the example of FIG. 1 has arrow A4 illustrating a case where a terminal device transmits data to a base station, transmission of data from the base station to the terminal device also starts after the establishment of a connection between the base station and the terminal device.

As a related art, a communication scheme is proposed in which a base station periodically confirms whether or not there is transmission of data from a terminal device to which a connection has already been established. According to this scheme, a terminal device transmits a packet containing a long preamble. The base station confirms part of the long preamble and thereafter receives data transmitted from the terminal device during a period other than a period during which the confirmation is performed periodically (for example, patent document 1 etc.). Also, a communication system including a base station and a plurality of grouped terminal devices has been invented. According to this system, an isolated time slot is assigned to a terminal device in the group, the phase is adjusted for each group, and communications between a terminal device for which the phase has been adjusted and the base station are conducted in a prescribed time slot (Patent Document 1 for example). A terminal device is also known that repeatedly transmits the same upstream user data to a base station the number of times determined on the basis of a value related to the distance to the base station (Patent Document 2 for example). Further, a broadcasting system is also known that uses a frame containing a movement reception symbol and a fixed reception symbol (Patent Document 3 for example).

Patent Document 1: Japanese Laid-open Patent Publication No. 9-294099
Patent Document 2: Japanese Laid-open Patent Publication No. 2009-130904
Patent Document 3: Japanese Laid-open Patent Publication No. 9-135230
Non-Patent Document 4: IEEE Std 802.15.4, IEEE Standard for Local and Metropolitan Area Network—Part 15.4: Low-Rate Wireless Personal Area Networks (LR-WPANs), [online], 27 Apr. 2012, IEEE Standard Association, [searched on Jul. 29, 2014], Internet <URL: http://standards.ieee.org/findstds/standard/802.15.4g-2012.html>

When data transmitted and received after the establishment of a connection is data for which instantaneous processes are desirable, the data sometimes fails to receive a process in time depending upon a time that it takes the terminal device to establish a connection by using the control slot between the terminal device and the base station as a communication destination. While a case of using a BAN has been explained as an example, a similar problem occurs also in communications using other networks. Also, because it is not possible to reduce a time taken to perform a process of starting transmission and reception of data such as the establishment of a communication between a terminal device and a base station no matter which of the related arts described above is applied, a long time is taken before emergency data starts to be processed.

SUMMARY

A base station apparatus comprising according to an aspect includes a processor, a memory and a communication circuit. The processor is configured to set a waiting period in which a packet from a terminal device to which a connection has not been established is awaited. The memory is configured to store data that is processed by a terminal device to which a connection is established. The communication circuit is configured to, upon receiving a first packet from a communication terminal device in the waiting period, transmit to the communication terminal device a second packet containing the data and information used by the communication terminal device for establishing a connection.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of a method of a communication conducted in a body area network;

FIG. 3 illustrates an example of a distribution of networks;

FIG. 5 illustrates an example of a configuration of a terminal device;

FIG. 6 illustrates an example of a hardware configuration;

FIG. 18 illustrates an example of communication procedures avoided by the third embodiment;

FIG. 20 illustrates an example of a configuration of a base station used in a fourth embodiment;

FIG. 24 illustrates an example of a communication conducted in a fifth embodiment; and FIG. 25 illustrates an example of a method of changing a timing for transmitting a notification signal.

DESCRIPTION OF EMBODIMENTS

Figure 2:
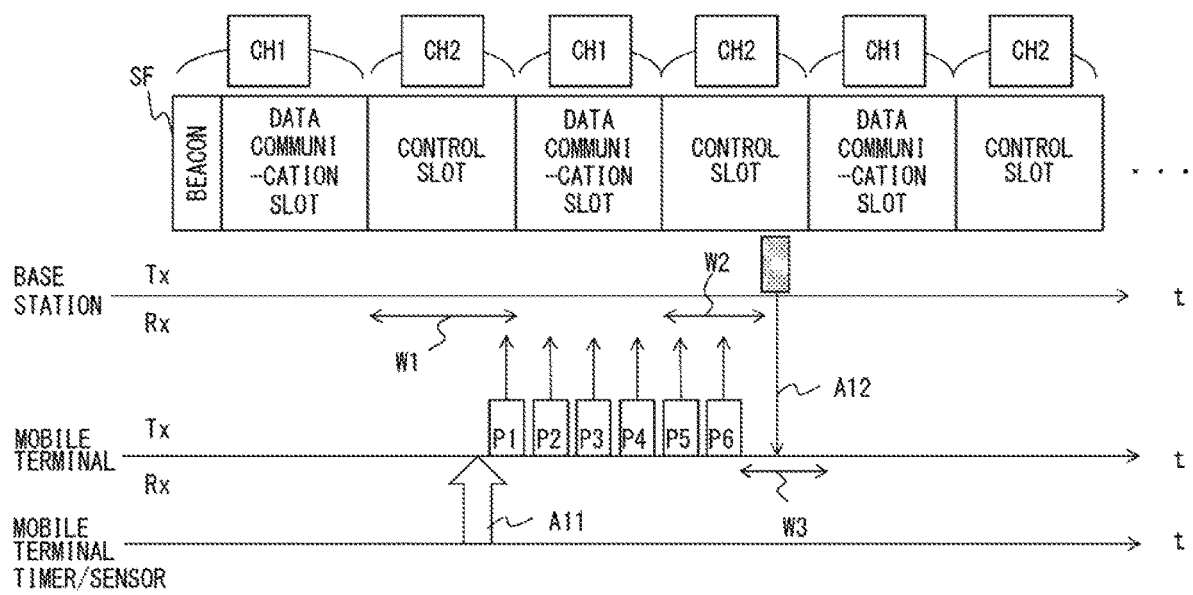
FIG. 2 illustrates an example of a communication method according to an embodiment.

FIG. 2 illustrates an example of a communication method according to an embodiment. A superframe used in a communication method according to an embodiment as well contains a beacon, a data communication slot and a control slot. It is assumed in the explanations below that a communication is conducted in a data communication slot by using frequency F1 and a communication is conducted in a control slot by using frequency F2. Accordingly, a circuit for communications (communication circuit) in a base station is set for communications at frequency F1 in a data communication slot and the circuit is set for communications at frequency F2 in a control slot. Note in FIG. 2 that CH1 represents a channel used for communications at frequency F1 and CH2 represents a channel used for communications at frequency F2. Also, in a communication method according to an embodiment, abase station waits until it receives a packet without transmitting a notification signal during a control slot as represented as waiting period w1. Hereinafter, a period during which a base station does not transmit a notification signal or a packet in a control slot may also be referred to as a "waiting period". Further, it is assumed that a mobile terminal that starts a communication is beforehand set to conduct communications by using frequency F2.

It is assumed that a sensor etc. of a mobile terminal detected occurrence of a communication trigger as indicated by arrow A11. Then, the mobile terminal transmits a prescribed number of packets toward the base station at prescribed time intervals. Because the prescribed number is 6 in the example illustrated in FIG. 2, the mobile terminal transmits packets P1 through P6 to the base station. Note that a mobile terminal can transmit an arbitrary packet including a control packet and a data packet to a base station as a packet for starting a communication.

In the example illustrated in FIG. 2, a control slot ended before the tail of packet P1 arrived at the base station, and thus it is assumed that packet P1 has not been received by the base station. When a control slot ends and a data communication slot starts, the base station starts a communication by using frequency F1 with a device that has been conducting a communication with it.

It is assumed that after the base station started a communication using frequency F1, the mobile terminal transmitted packets P2 through P4 to the base station. In such a case, while the base station is conducting a communication by using frequency F1, packets P2 through P4 are transmitted at frequency F2. Therefore, the base station does not receive packets P2 through P4. Also, a packet transmitted by the mobile terminal does not cause interference to communications between the base station and other devices.

When the data communication slot ends thereafter, the base station adjusts the circuit used for communication processes back to frequency F2. Accordingly, the base station again becomes able to receive a packet from a mobile terminal during waiting period w2. In this example, it is assumed that the base station received packets P5 and P6 from a mobile terminal. Receiving a packet in a control slot, the base station determine that the transmission source of the packet received in the control slot is requesting, from the base station, establishment of a communication and transmission of data. Then, the base station generates a response packet containing data to be processed by a device that communicates with the base station. Also, the base station performs a process of establishing a connection to the mobile terminal such as determination of a timing for conducting a communication with the mobile terminal by using a data communication slot.

At arrow A12, the base station transmits, to the mobile terminal, a response packet containing information such as data to be processed by the mobile terminal and a timing for a communication with the mobile terminal. Note that because the mobile terminal is waiting for reception of a packet from the base station after transmission of a prescribed number of packets (waiting period w3), it is assumed that the mobile terminal can receive a response packet.

The mobile terminal processes data contained in the response packet. Also, the mobile terminal in parallel establishes a communication between the base station by using the information in the response packet. Thereafter, communications between the base station and the mobile terminal are conducted by using a data communication slot. Note that establishment of a communication between a base station 10 and a mobile terminal 40 means generation of a connection for a communication between the base station 10 and the mobile terminal 40.

As described above, according to a method of an embodiment, the base station transmits data that is to be processed by a mobile terminal before establishment of a connection to the mobile terminal. This makes it possible for a mobile terminal to process data reported by a response packet regardless of whether or not the establishment of a connection to the base station has been completed. This makes it possible for a mobile terminal to use a response packet to obtain data for which immediate processing by the mobile terminal is desirable, and also to reduce a process delay of data.

Further, a method according to an embodiment can also reduce a time taken to establish a connection between a base station and a mobile terminal. In other words, a connection is established by transmission, by a base station, of a response packet in response to a packet received in a control slot, and thus a communication is started at an early stage between the base station and a mobile terminal without waiting for transmission of a notification signal or a connection request from the mobile terminal.

Note that when there are no devices that are communicating with a base station when a mobile terminal starts a communication with the base station, it is not necessary to use different frequencies for a data communication slot and a control slot. Also, depending upon implementation, different numbers of packets may be transmitted from a mobile terminal toward a base station.

<Configuration Example of Network and Device>

FIG. 3 illustrates an example of a distribution of networks. In case of a BAN, devices constituting the BAN are set at positions close to the body of the user. Accordingly, when users using BANs exist close to each other, a situation results where a plurality of BANs exist close to each other as illustrated in FIG. 3. A situation with a plurality of BANs existing close to each other leads to a risk that the BANs will cause interference to each other, so each base station sets a different frequency from another base station to a frequency used in data communication slots. A situation with BANs existing close to each other herein means a situation in which for example the positions of the BANs are so close to each other as to cause overlapping between devices for which communications are possible in a base station having a plurality of BANs.

The example illustrated in FIG. 3 illustrates a case in which three BANs B1 through B3 exist close to each other. The BAN of B1 has terminal devices 5a and 5b in addition to a base station. Similarly, the BAN of B2 has a base station and terminal devices 5c and 5d and the BAN of B3 has a base station and terminal devices 5e and 5f. By using data communication slots, each of terminal devices 5a through 5f is communicating with the base station in the BAN in which it is included. The mobile terminal 40 is moving in an area having the BANs of B1 through B3, and the mobile terminal 40 conducts a communication with a base station to which a connection is established. In the example illustrated in FIG. 3, it is assumed that the position of the mobile terminal 40 at time T1 is 40T1, the position of the mobile terminal 40 at time T2 is 40T2 and the position of the mobile terminal 40 at time T3 is 40T3. As represented by mobile terminal 40T1, at time T1, the mobile terminal 40 has joined the BAN of B1 by establishing a connection to the base station in the BAN of B1. Thereafter, at time T2, the mobile terminal 40T2 establishes a connection to the base station in the BAN of B2 so as to join the BAN of B2. Similarly, at time T3, the mobile terminal 40 starts communications with the base station in the BAN of B3 so as to join the BAN of B3 and conduct communications.

Figure 4:
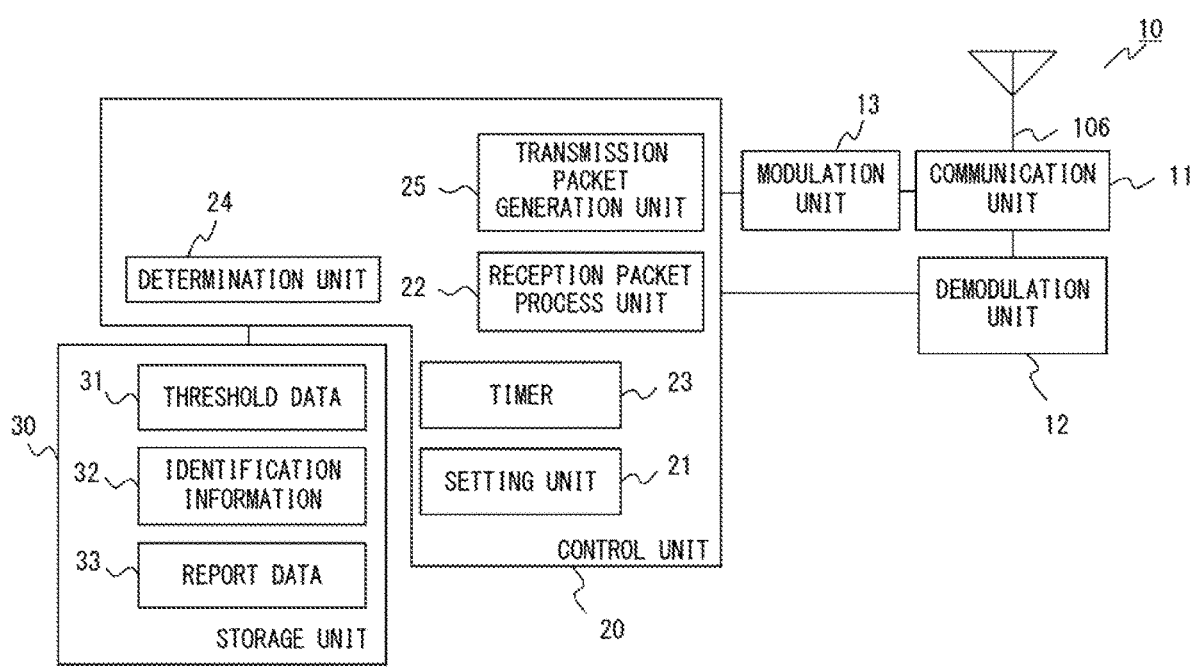
FIG. 4 illustrates an example of a configuration of a base station.

FIG. 4 illustrates an example of a configuration of the base station 10. The base station 10 includes a communication unit 11, a demodulation unit 12, a modulation unit 13, a control unit 20, a storage unit 30 and an antenna 106. The control unit 20 includes a setting unit 21, a reception packet process unit 22, a timer 23, a determination unit 24 and a transmission packet generation unit 25. The storage unit 30 stores threshold data 31 and report data 33. Further, the storage unit 30 may optionally hold identification information 32.

The communication unit 11 transmits and receives a signal with the mobile terminal 40 and the terminal device 5. The communication unit 11 outputs a reception signal to the demodulation unit 12. The demodulation unit 12 outputs, to the reception packet process unit 22, a reception packet obtained by a demodulation process performed on a reception signal and removal of the carrier wave. The modulation unit 13 converts a packet generated by the control unit 20 into a signal by using a carrier wave, and also performs a modulation process. The communication unit 11 transmits a signal modulated by a modulation unit 15.

The setting unit 21 sets the length of a slot in the superframe used by the base station 10. Also, the setting unit 21 holds information of a frequency band used by each slot, and also performs a process of changing the frequency of a carrier wave used by the communication unit 11 depending on a slot. The reception packet process unit 22 extracts data from a packet input from the demodulation unit 12 so as to process it appropriately. The determination unit 24 determines a timing for transmitting a response packet. The timer 23 is used for measuring a time before the timing determined by the determination unit 24 for transmitting a response packet. The transmission packet generation unit 25 generates a response packet and other packets to be transmitted, so as to output the generated packet to the modulation unit 13.

The threshold data 31 is data used by the determination unit 24 for determining a timing for transmitting a response packet, and explanations will be given for this later in detail. The report data 33 is data that is transmitted to the mobile terminal 40 by using a response packet before establishment of a connection. The identification information 32 is identification information of the mobile terminal 40 having a relatively high possibility of communicating with the base station 10. Here, the mobile terminal 40 having a relatively high possibility of communicating with the base station 10 can be the mobile terminal 40 that can establish connection with the base station 10.

FIG. 5 illustrates an example of a configuration of a mobile terminal. The mobile terminal 40 includes a communication unit 41, a demodulation unit 42, a modulation unit 43, a control unit 50, a storage unit 60 and an antenna 106. The control unit 50 includes a reception packet process unit 51, an application process unit 52, a trigger generation unit 53 and a transmission packet generation unit 54.

The communication unit 41 receives a signal transmitted from the base station 10 so as to output it to the demodulation unit 42. The demodulation unit 42 outputs, to the reception packet process unit 51, a reception packet obtained by a demodulation process performed on a reception signal and removal of the carrier wave. The modulation unit 43 converts a packet generated by the control unit 50 into a transmission signal by using a carrier wave, and also performs a modulation process. The communication unit 41 transmits a signal modulated by the modulation unit 43.

The reception packet process unit 51 extracts data from a packet input from the demodulation unit 42 so as to output it to the application process unit 52. The application process unit 52 processes received data. When a condition for the mobile terminal 40 to establish a connection to the base station 10 is met, the trigger generation unit 53 outputs a trigger to the transmission packet generation unit 54 so as to make a request for the transmission packet generation unit 54 to generate a transmission packet for starting a communication with the base station 10. In response to the request from the trigger generation unit 53 or the application process unit 52, the transmission packet generation unit 54 appropriately generates a packet so as to output the generated packet to the modulation unit 43. Note that when generating a transmission packet in response to a request from the trigger generation unit 53, the transmission packet generation unit 54 transmits the same number of packets to the base station 10 as the number of times of continuous transmission in a transmission condition 61 stored in the storage unit 60.

The storage unit 60 stores the transmission condition 61 and base station data 62. The transmission condition 61 is a packet transmission condition including the number of times of continuous packet transmission, packet transmission intervals, etc. The base station data 62 is data contained in a response packet received from the base station 10.

FIG. 6 illustrates an example of a hardware configuration. Each of the base station 10 and the mobile terminal 40 has a processor 103, a read only memory (ROM) 104, a random access memory (RAM) 105 and an antenna 106. Further, each of the base station 10 and the mobile terminal 40 has a radio frequency integrated circuit (RFIC) 101 and a baseband large scale integration (LSI) 102. Note that the processor 103 is an arbitrary processing circuit including a central processing unit (CPU).

In the base station 10, the processor 103 operates as the control unit 20 and the RAM 105 operates as the storage unit 30. The communication unit 11 is implemented by the RFIC 101. The demodulation unit 12 and the modulation unit 13 are implemented by the baseband LSI 102.

In the mobile terminal 40, the processor 103 operates as the control unit 50 and the RAM 105 operates as the storage unit 60. The communication unit 41 is implemented by the RFIC 101. The demodulation unit 42 and the modulation unit 43 are implemented by the baseband LSI 102. Note that in each of the base station 10 and the mobile terminal 40, a program, data, etc., that are read by the processor 103 for operations are stored in the ROM 104.

Note that the mobile terminal 40 may be provided with a sensor or a timer appropriately. When a sensor or a timer is included in the mobile terminal 40, the trigger generation unit 53 is implemented by the sensor or the timer and the processor 103.

First Embodiment

Figure 7:
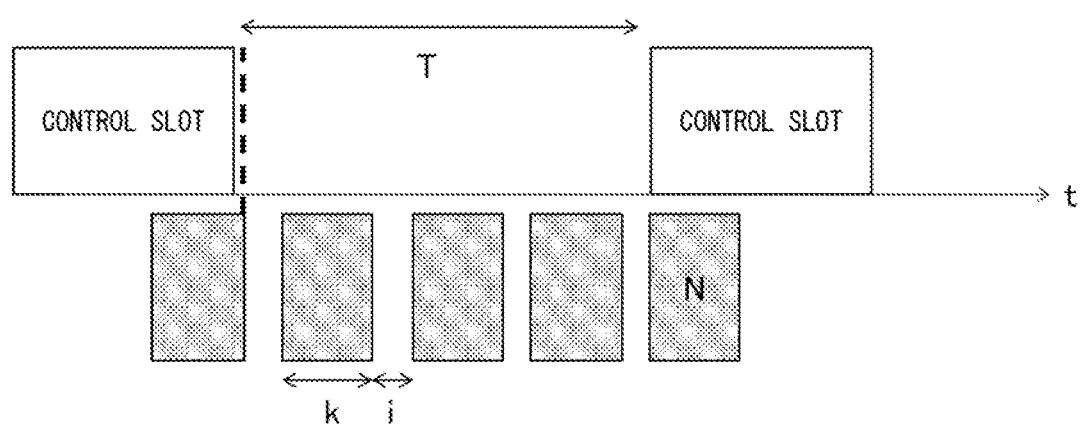
FIG. 7 illustrates an example of a method of determining a transmission condition of packets.

FIG. 7 illustrates an example of a determination method of the transmission condition 61 of a packet. It is assumed that the transmission condition 61 is set in the mobile terminal 40 in advance. The transmission condition 61 is set in such a manner that the base station 10 can receive at least one packet in accordance with the lengths of control slots and the intervals between the control slots in the superframe of the base station 10.

As illustrated in FIG. 7, at a worst timing in a case where the mobile terminal 40 transmits a packet to the base station 10, a control slot in the base station 10 ends before the base station 10 completes the reception of the packet. In such a case, unless at least one packet is transmitted from the mobile terminal 40 to the base station 10 at a time that is on or after the start time of the next control slot, a connection is not established between the base station 10 and the mobile terminal 40. Accordingly, transmission of N−2 or less packets is permitted, N−2 being a number smaller, by two, than the number of times of continuous transmission N in a time between control slots. For example, as illustrated in FIG. 7, it is set that three or less packets are transmitted in two control slots when N=5. Also, the number of transmission intervals of packets may be greater, by at most one, than the number of packets transmitted in control slots. Accordingly, when the transmission intervals of packets are i, the formula (1) is satisfied between i and time T between two control slots, where k represents the length of a time taken to receive one packet in the base station 10.

$$T < (N-2) \times k + (N-1) \times i \tag{1}$$

The transmission condition 61 is a combination of the number of times of continuous transmission N and transmission intervals i that are determined in such a manner that formula (1) is satisfied.

Figure 8:
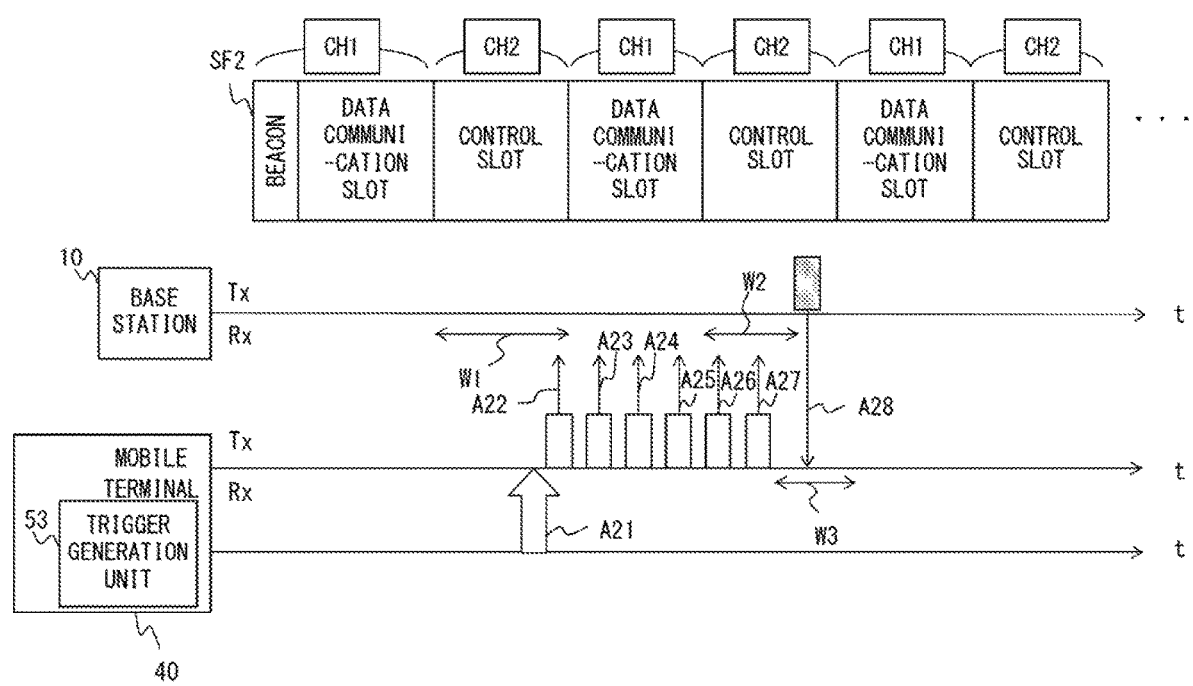
FIG. 8 illustrates an example of communications conducted in the first embodiment.

FIG. 8 illustrates an example of communications conducted in the first embodiment. By referring to FIG. 8, an example of processes performed in the base station 10 and the mobile terminal 40 is explained by using an exemplary case where the mobile terminal 40 establishes a connection to the base station 10c at time T3 illustrated in FIG. 3. It is assumed that when transmitting a packet for establishing a connection, the mobile terminal 40 conducts a communication at frequency F2 and the mobile terminal 40 conducts a communication in a frequency band reported by the base station 10c after the establishment of the connection to the base station 10c.

It is assumed that the base station 10c is using superframe SF2 illustrated in FIG. 8. It is also assumed that CH1 is a channel for a communication at frequency F1 and CH2 is a channel for a communication at frequency F2. In such a case, in accordance with superframe SF2, the setting unit 21 changes the frequency used by the communication unit 11, the demodulation unit 12 and the modulation unit 13. For example, during the transmission of the beacon and in the first data communication slot, the communication unit 11, the demodulation unit 12 and the modulation unit 13 are set to use frequency F1. When the data communication slot ends, the setting unit 21 changes the frequency used by the communication unit 11, the demodulation unit 12 and the modulation unit 13 to frequency F2 so that communications in control slots are possible. Accordingly, in waiting period w1 during which the base station 10c waits a packet to be received from the mobile terminal 40, the base station 10c is waiting for reception of a packet that is transmitted at frequency F2 (through CH2).

It is assumed that the trigger generation unit 53 of the mobile terminal 40 at arrow A21 detects an event that becomes a trigger for a request to the base station 10 for a connection. Events such as for example one in which the power received from the base station 10 exceeds a threshold, one in which data to be reported to the base station 10 is obtained from a sensor, etc., can become a trigger to make a request to the base station 10 for a connection. Detecting an event that becomes a trigger to make a request to the base station 10 for a connection, the trigger generation unit 53 outputs the trigger to the transmission packet generation unit 54.

Receiving the trigger from the trigger generation unit 53, the transmission packet generation unit 54 obtains the transmission condition 61 from the storage unit 60 so as to obtain the number of times of performing continuous transmission of packets N. The transmission packet generation unit 54 generates a packet to be transmitted, and outputs the packet to the modulation unit 43. The modulation unit 43 generates a baseband signal from the packet input from the transmission packet generation unit 54, and performs a modulation process. The modulation unit 43 outputs a signal after the modulation process to the communication unit 41. The communication unit 41 uses a carrier wave at frequency F2 so as to transmit the packet (arrow A22).

It is assumed that process in the second data communication slot have started in the base station 10c before the tail of the packet transmitted at arrow A22 arrives at the base station 10c. In such a case as well, the reception packet process unit 22 determines that the reception failed so as to discard the reception packet although the communication unit 11 and the demodulation unit 12 in the base station 10c perform the reception process and the demodulation. Further, in order to conduct a communication in a data communication slot, the setting unit 21 changes the frequency used by the communication unit 11, the demodulation unit 12 and the modulation unit 13 to frequency F1.

Meanwhile, the transmission packet generation unit 54 of the mobile terminal 40 outputs a packet to the modulation unit 43 so that a next packet is transmitted to the base station 10c when transmission interval i has elapsed since a packet was transmitted at arrow A22. On a packet input from the transmission packet generation unit 54, the modulation unit 43 and the communication unit 41 perform a process similar to one performed on the packet transmitted at arrow A22. Accordingly, a new packet is transmitted from the mobile terminal 40 to the base station 10c (arrow A23). Note that frequency F2 is used for this transmission of a packet.

Because the communication unit 11 and the demodulation unit 12 in the base station 10c are operating at frequency F1 (through CH1) when the packet transmitted at arrow A23 arrives at the base station 10c, the packet is not received. Further, while packets are again transmitted from the mobile terminal 40 at frequency F2 as represented by arrow A24 and arrow A25, the packets are not received because the base station 10c is conducting communications at frequency F1, similarly to the packet transmitted at arrow A23.

Next, it is assumed that the process in the second control slot has started in the base station 10c. The setting unit 21 changes the frequency used by the communication unit 11, the demodulation unit 12 and the modulation unit 13 to frequency F2. Accordingly, the base station 10c is set to be able to receive a packet from the mobile terminal 40 as represented by waiting period w2.

At arrow A26, the mobile terminal 40 transmits a packet toward the base station 10c. The communication unit 11 of the base station 10c outputs the reception signal to the demodulation unit 12 and the demodulation unit 12 demodulates the input signal. The reception packet process unit 22 removes the header from the packet obtained through the demodulation and process the data. In order to determine a transmission timing for a response packet, the determination unit 24 uses the timer 23 so as to measure an elapsed time since the reception time when the packet was received at arrow A26. When a new packet is not received before the value measured by the timer 23 reaches threshold Th, the determination unit 24 determines that the last packet transmitted from the mobile terminal 40 has been received. It is assumed in this example that the base station 10c received a new packet as represented by arrow A27 from the mobile terminal 40 before a time represented by threshold Th has elapsed since the reception of a packet at arrow A26. Then, the determination unit 24 initializes the timer 23 and measures an elapsed time since the reception time of a packet at arrow A27.

The reception packet at arrow A27 as well is processed similarly to the packet at arrow A26 in the base station 10c. In this example, it is assumed that the base station 10c has not received a packet from the mobile terminal 40 even when a time represented by threshold Th has elapsed since the reception time of the packet at arrow A27. Then, the determination unit 24 determines that the reception of a packet has terminated and requests that the transmission packet generation unit 25 generate a response packet. The transmission packet generation unit 25 generates a response packet so as to output the generated response packet to the modulation unit 13. The response packet is transmitted to the mobile terminal 40 via the modulation unit 13 and the communication unit 11 at frequency F2 (through CH2) (arrow A28).

Because, upon the transmission of the packet at arrow A27, the mobile terminal 40 has completed the transmission of as many packets as the number of times of continuous transmission N to the base station 10c, the mobile terminal 40 waits in order to receive a packet transmitted from the base station 10 as represented by waiting period w3. Accordingly, a response packet transmitted at arrow A28 from the base station 10c to the mobile terminal 40 is received by the mobile terminal 40. The communication unit 41 outputs the reception signal to the demodulation unit 42, and the demodulation unit 42 performs a demodulation process. The reception packet process unit 51 extracts report data 33 and information of the base station from the packet obtained through the demodulation, and appropriately stores them in the storage unit 60 as the base station data 62. The base station data 62 contains the report data 33 contained in the response packet, the base station as the communication destination and a timing for a communication specified by that base station.

The application process unit 52 processes the report data 33 contained in the response packet by using an application. Accordingly, a process, in the mobile terminal 40, of emergency data reported as the report data 33 starts before the establishment of a connection between the base station 10c and the mobile terminal 40.

It is assumed that the application process unit 52 thereafter performed an application process so as to generate data to be transmitted to the base station 10. The transmission packet generation unit 54 generates a transmission packet containing data generated by the application process unit 52. Further, the transmission packet generation unit 54 uses the destination base station data 62 so as to perform a process of transmitting a packet by using the modulation unit 13 and the communication unit 11 in accordance with a timing for a communication specified by the destination base station. Accordingly, a communication process using a data communication slot starts between the mobile terminal 40 and the base station 10c.

Figure 9:
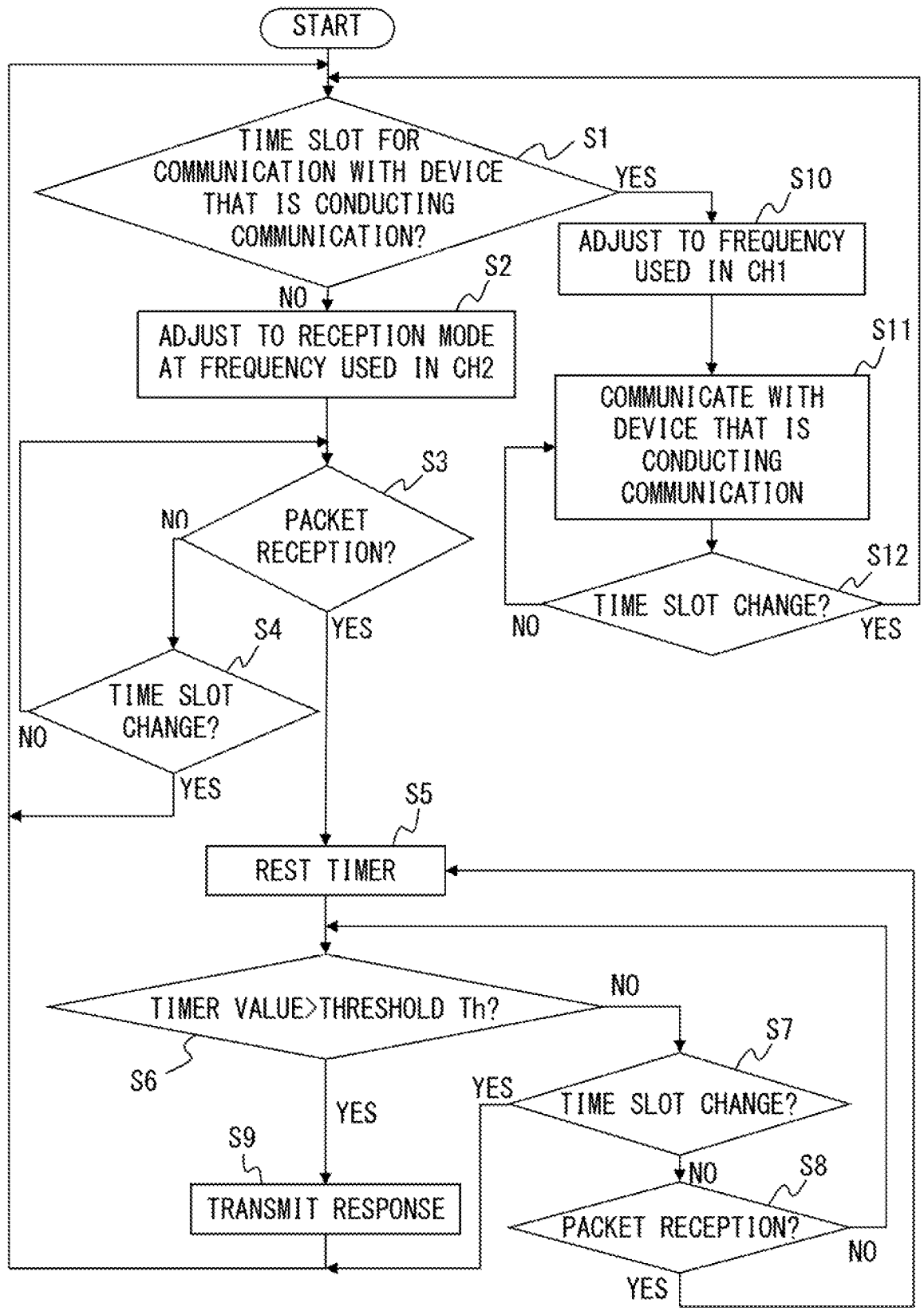
FIG. 9 is a flowchart illustrating an example of a process performed by the base station.

FIG. 9 is a flowchart illustrating an example of a process performed by the base station 10. Note that it is assumed in FIG. 9 as well that channel CH2 is used for the control between the base station 10 and the mobile terminal 40 and channel CH1 is used for data communications. It is also assumed that channels CH1 and CH2 use different frequencies.

The setting unit 21 determines whether or not the time slot is a time slot for data communication (data communication slot) used with the device that is conducting a communication (step S1). When the time slot is not a data communication slot with the device that is conducting a communication, the setting unit 21 sets the frequency of the communication unit 11, the demodulation unit 12 and the modulation unit 13 to the frequency used in CH2 and also adjusts the communication unit 11, the demodulation unit 12 and the modulation unit 13 to the reception mode (NO in step S1 and proceeds to step S2). The reception packet process unit 22 determines whether or not a packet has been received (step S3). When a packet has not been received, the setting unit 21 determines whether or not to change a time slot (NO in step S3 and proceeds to step S4). When it is not a time for changing a time slot, the processes in and after step S3 are repeated (NO in step S4). When it is determined to be a time for changing a time slot, the processes in and after step S1 are repeated (YES in step S4).

When the base station 10 receives a packet, the determination unit 24 resets the timer 23 (YES in step S3 and proceed to step S5). It is assumed that the timer 23 starts counting up after being reset. The determination unit 24 determines whether or not the timer value has exceeded threshold Th (step S6). When the determination unit 24 determines the timer value to not exceed threshold Th, the setting unit 21 determines whether or not a time slot is changed (NO in step S6 and proceed to step S7). When a time slot is changed, the processes in and after step S1 are repeated (YES in step S7). When a time slot is not changed, the reception packet process unit 22 determines whether or not a packet has been received (NO in step S7 and proceed to step S8). When the base station 10 has not received a new packet, the processes in and after step S6 are repeated (NO in step S8). When the base station 10 has received a new packet, the processes in and after step S5 are repeated (YES in step S8).

In step S6, when the timer value has exceeded threshold Th, the determination unit 24 determines to transmit a response packet to the mobile terminal 40 (YES in step S6). The transmission packet generation unit 25 generates a response packet in response to a request from the determination unit 24, and transmits a response packet to the mobile terminal 40 via the modulation unit 13 and the communication unit 11 (step S9). Thereafter, the processes in and after step S1 are repeated in preparation for a case where other devices make a request for a connection.

When the time slot is determined to be a data communication slot in step S1, the setting unit 21 adjusts the communication unit 11, the demodulation unit 12 and the modulation unit 13 to the frequency used in CH1 (NO in step S1 and proceed to step S10). Thereafter, until the time slot is changed, communications are conducted between the device conducting a communication and the base station 10 (step S11 and NO in step S12). When a time for changing a time slot has arrived, the processes in and after step S1 are performed (YES in step S12).

Note that the processes in step S5 through step S8 are used for determining whether or not a new packet has been received from the mobile terminal 40 after reception of a packet. In other words, because of the processes in step S5 through step S8, the base station 10 does not return a response packet to the mobile terminal 40 before the mobile terminal 40 completes the transmission of as many packets as the number of times of continuous transmission to the base station 10. This prevents a situation where the base station 10 fails in the transmission of a response packet due to interference or a collision between a response packet addressed to the mobile terminal 40 by the base station 10 and a packet transmitted from the mobile terminal 40 to the base station 10.

Figure 10:
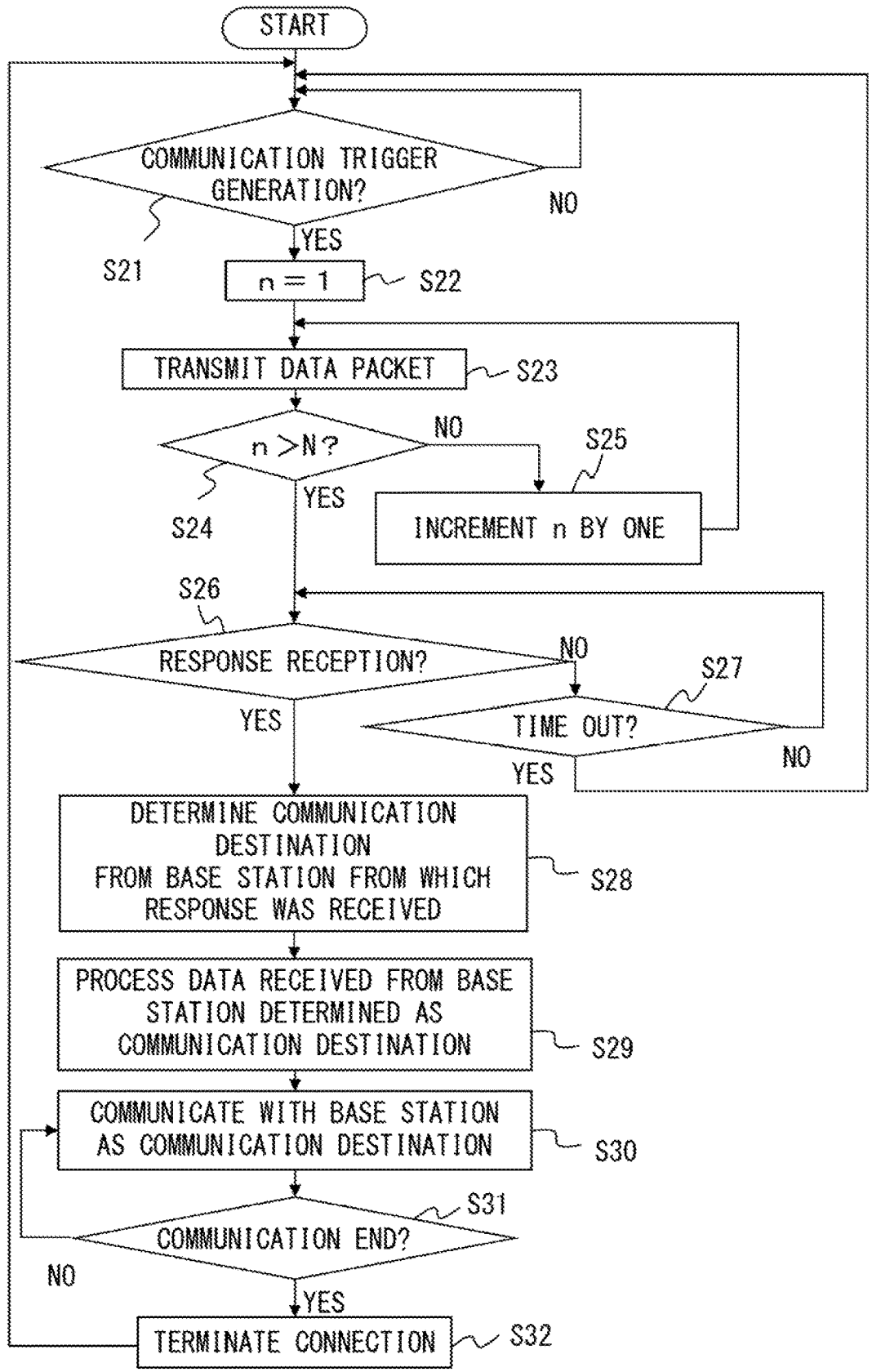
FIG. 10 is a flowchart illustrating an example of a process performed by a mobile terminal.

FIG. 10 is a flowchart illustrating an example of a process performed by the mobile terminal 40. In FIG. 10, constant N is a number of times of continuous transmission of packets, and variable n is a value for counting the number of packets that were transmitted by the mobile terminal 40. Note that while the example illustrated in FIG. 10 illustrates an example where the mobile terminal 40 transmits a data packet in order to establish a connection to the base station 10, arbitrary types of packets may be transmitted by the mobile terminal 40 in step S23. Note also that packets transmitted in step S23 may all be identical or may contain different data. Also, the process in step S28 is included in order to respond to a case where the mobile terminal 40 receives response packets from an arbitrary number of base stations, the mobile terminal 40 may receive a response packet from only one base station.

The trigger generation unit 53 waits until a communication trigger occurs (NO in step S21). When a communication trigger occurs, the transmission packet generation unit 54 sets variable n to 1 (YES in step S21 and proceed to step S22). The transmission packet generation unit 54 transmits a data packet via the modulation unit 43 and communication unit 41 so as to determine whether or not variable n has exceeded constant N (step S23 and step S24). When variable n has not exceeded constant N, the transmission packet generation unit 54 increments variable n by one, and returns to step S23 (NO in step S24 and proceed to step S25).

When variable n has exceeded constant N, the reception packet process unit 51 determines whether or not a response packet has been received from the base station 10 (step S26). When a response packet has not been received from the base station 10, the reception packet process unit 51 determines whether or not time-out has occurred in the waiting for the response packet (NO in step S26 and proceed to step S27). When time-out has not occurred, the processes in and after step S26 are repeated (NO in step S27). When time-out occurs, it is determined that the communication with the base station 10 has failed and the process returns to step S21 (YES in step S27).

When a response packet is received from the base station 10, the reception packet process unit 51 determines a communication destination from the base station treated as the transmission source of the received response packet (YES in step S26 and proceed to step S28). Further, the reception packet process unit 51 outputs, to the application process unit 52, the report data 33 contained in the response packet received from the base station 10 that is determined as the communication destination. The application process unit 52 processes the report data 33 input from the reception packet process unit 51 (step S29). Thereafter, the mobile terminal 40 communicates with the base station 10 as the communication destination until the end of the communication (step S30 and NO in step S31). Upon the termination of the communication, the transmission packet generation unit 54 performs a process for terminating the connection (YES in step S31 and proceed to step S32).

As was explained in step S29, the application process unit 52 can process data transmitted before establishment of a connection from the base station 10 determined as the communication destination. This makes it possible for the mobile terminal 40 to process, at an early stage, emergency data etc., reported from the base station 10 and also to reduce a delay in processing emergency data.

Figure 11:
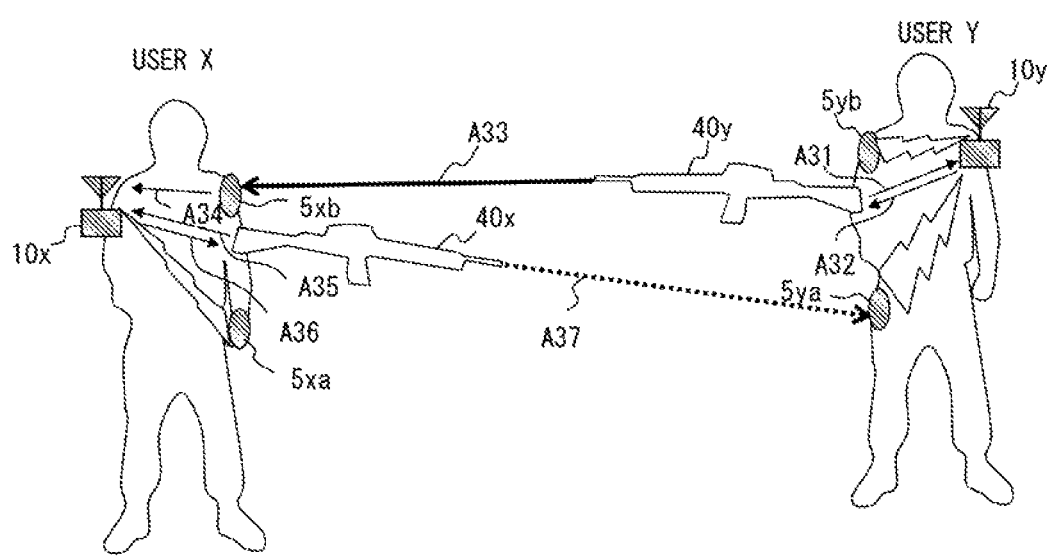
FIG. 11 illustrates an example of applying a communication system.

FIG. 11 illustrates an example in which the communication system is applied. FIG. 11 illustrates an example in which the communication system is applied to a laser system etc., of a shooting game, a target practice system. It is assumed that the base station 10 communicates with an administrative server (not illustrated) that holds the score and the practice program of each user regardless of which of the laser systems of a shooting game and a target practice the communication system is applied to.

It is assumed that user X is wearing a BAN having the base station 10x and the terminal devices 5xa and 5xb and user Y is wearing a BAN having the base station 10y and the terminal devices 5ya and 5yb. In the example illustrated in FIG. 11, the mobile terminals 40x and 40y are firearms such as a laser device, a gun, etc. used for the practice or the game. The terminal devices 5xa through 5yb are optical receivers that can receive a laser beam etc., emitted from the mobile terminals 40x and 40y. It is assumed that the base station 10x obtains the status of user X from the administrative server and the base station 10y obtains the status of user Y from the administrative server. It is hereinafter assumed that the report data 33 is the status of each user and the status of each user is information representing whether or not a valid laser beam can be emitted. Also, in the explanations below, an example is used where a valid laser beam is not emitted even when a user who has already been shot operates a firearm. Note that a user getting shot by another user means a situation where the optical receiver (terminal device 5) worn by the user receives a laser beam emitted from a firearm (mobile terminal 40) used by another user who is eligible to emit a valid laser beam. Also, in the explanations below, in order to facilitate the finding of a device that is being operated, an alphabetic character given to the operating mobile terminal 40 and base station 10 may be added after the symbol of the operated device. For example, the trigger generation unit 53y is the trigger generation unit 53 included in the mobile terminal 40y.

First, it is assumed that that user Y pulled the trigger of the firearm operating as the mobile terminal 40y. In response to the operation of the trigger of a firearm operating as the mobile terminal 40y, the trigger generation unit 53y causes a communication trigger. On the basis of the communication trigger, the transmission packet generation unit 54y determines that there is a request for start of a communication.

As represented by arrow A31, the transmission packet generation unit 54y transmits a report packet as many times as specified by the number of times of continuous transmission N in order to report that the mobile terminal 40y has started firing preparation. It is assumed that in response to the transmission of a report packet from the mobile terminal 40y in a control slot of the base station 10y, the base station 10y received a report packet from the mobile terminal 40y. Then, the base station 10y transmits a response packet containing the status of user Y to the mobile terminal 40y as represented by arrow A32. It is assumed that information indicating that user Y is eligible to emit a valid laser beam is reported to the mobile terminal 40y at that moment. Also, because of transmission and reception of response packets, a connection has been established between the mobile terminal 40y and the base station 10y.

As represented by arrow A33, it is assumed that user Y used the mobile terminal 40y to emit a laser beam to the terminal device 5xb worn by user X. Then, the mobile terminal 40y reports, to the base station 10y, information indicating that valid laser beam was emitted. For this, the mobile terminal 40y and the base station 10y communicate in a data communication slot of the base station 10y. The base station 10y reports, to the administrative server, that a laser beam was emitted from the mobile terminal 40y.

As represented by the arrow A34, the terminal device 5xb, worn by user X, uses a data communication slot assigned from the base station 10x so as to report that a valid laser beam was received. The reception packet process unit 22x of the base station 10 changes the status of user X so that a valid laser beam will not be emitted. Note that the transmission packet generation unit 25x may report to the administrative server the change of the status of user X.

It is assumed that immediately after base station 10x received information indicating that a laser beam was emitted to the terminal device 5xb, the user X pulled the trigger of the mobile terminal 40x. Then, the trigger generation unit 53x causes a communication trigger. The transmission packet generation unit 54x transmits a report packet as many times as specified by the number of times of continuous transmission N in order to report that the mobile terminal 40x has started firing preparation (arrow A35). It is assumed that the base station 10x received a report packet from the mobile terminal 40x in a control slot. Then, the base station 10x transmits, to the mobile terminal 40x, a response packet that includes information indicating that user X is not able to emit a valid laser beam (arrow A36).

Next, it is assumed that user X used the mobile terminal 40x and tried to emit a laser beam to the terminal device 5ya, worn by user Y. However, because the mobile terminal 40x has received a report from the base station 10x that it is not possible to emit a valid laser beam, the mobile terminal 40x does not emit a laser beam (arrow A37).

As described above, the base station 10 reports, to the mobile terminal 40, information indicating whether or not the user is eligible to emit a valid laser beam, together with information for establishing a connection to the mobile terminal 40. Accordingly, a firearm operating as the mobile terminal 40 can obtain information indicating whether or not the user is eligible to emit a valid laser beam before starting a process of emitting a laser beam. Accordingly, the first embodiment can prevent a situation where the firearm of a user who is not eligible to emit a valid laser beam emits a laser beam because a long time is taken to report the change of the status to the firearm. Accordingly, the first embodiment can enhance the sense of realism of the game by applying the first embodiment to the game system. Also, by applying the first embodiment to a practice system, the accuracy of the practice can be increased and accurate data of the shooting result of each user can also be sampled.

Figure 12:
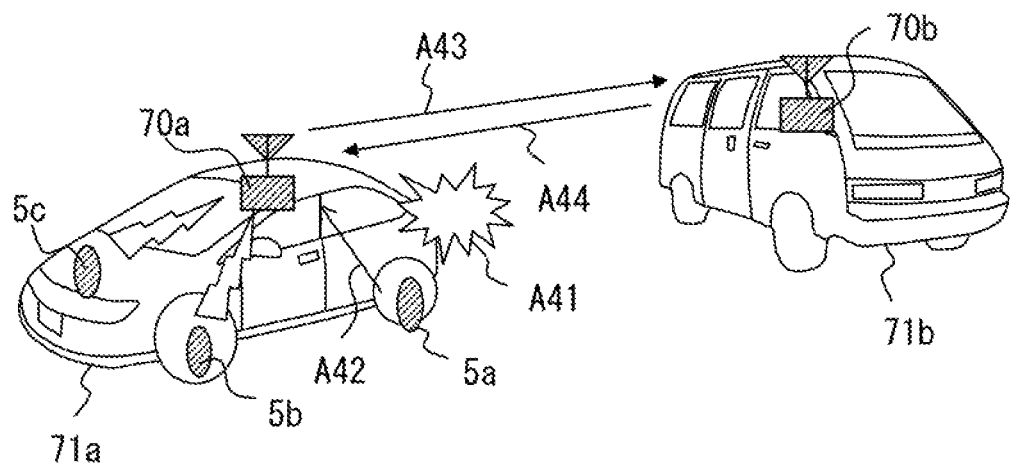
FIG. 12 illustrates an example of applying a communication system.

FIG. 12 illustrates an example of a case where the first embodiment is applied to a system for identifying a vehicle that caused an accident. In the example illustrated in FIG. 12, it is assumed that each onboard device 70 operates both as the base station 10 and the mobile terminal 40. The onboard device 70 operates as the base station 10 for the terminal device 5 belonging to the same network, and operates as either the base station 10 or the mobile terminal 40 for a terminal device in a different network. Hereinafter, explanations will be given by using an exemplary case where the onboard device 70a is installed in a vehicle 71a and the onboard device 70b is installed in a vehicle 71b. It is also assumed that the terminal devices 5a through 5c are also installed in the vehicle 71a and the onboard device 70a is in the same network as that including the terminal devices 5a through 5c. Note that the terminal devices 5a through 5c are assumed to include sensors that detect deformation etc., of the vehicle 71a. Each of the onboard devices 70 uses the ID of itself as the report data 33. Further, it is assumed that information associating the ID of the onboard device 70, the vehicle 71 including the onboard device 70 and the ID of the user of the vehicle 71 is held by police etc., in advance.

It is assumed that the vehicle 71b caused a rear-end collision with the rear portion of the vehicle 71a at A41. Detecting partial deformation of the vehicle 71a caused by the collision, the terminal device 5a reports the occurrence of the deformation to the onboard device 70a (arrow A42). Note that communications between the terminal device 5a and the onboard device 70a are conducted by using a data communication slot.

In response to a report from the terminal device 5a, the trigger generation unit 53a included in the onboard device 70a makes a request to the transmission packet generation unit 54a for a communication. The transmission packet generation unit 54a broadcasts as many packets as specified by the number of times of continuous transmission N (arrow A43).

Receiving a packet transmitted at arrow A43, an onboard device 70b transmits a response packet containing the identification information of that onboard device to the onboard device 70a. It is assumed for example that a packet is transmitted from the onboard device 70a while the vehicle 71b, which caused the accident, is located near the vehicle 71a as illustrated in FIG. 12 because of prompt execution of the processes at A41 through A43 by the onboard device 70a. Then, in response to the packet transmitted from the onboard device 70a, the onboard device 70b transmits a response packet containing the identification information of the onboard device 70b to the onboard device 70a (arrow A44). Thereby, the onboard device 70a installed in the vehicle 71a, which got involved in the accident can obtain information of the onboard device 70b installed in the vehicle 71b, which caused the accident.

It is desirable for a system for identifying a vehicle that caused an accident to obtain information that can be used for identifying a vehicle having caused the accident at an early stage because there is a possibility that the person who caused the accident may flee the site soon. The first embodiment makes it possible for the onboard device of the vehicle of a victim to obtain the information of the onboard device installed in the vehicle of the person who caused the accident before the person flees the site. This makes it possible for police to identify the person who caused an accident at an early stage by using the identification information of the onboard device.

Second Embodiment

In the second embodiment, explanations will be given for a case where a sequence number is included in a packet transmitted from the mobile terminal 40 for starting a communication. In this example, a sequence number is a number representing the ordinal number of a packet among as many packets as specified by the number of times of continuous transmission N that are transmitted for making a request to the base station 10 for a communication. The determination unit 24 in the base station 10 can use the sequence number and the number of times of continuous transmission N so as to calculate a time taken before the completion of transmission of packets from the mobile terminal 40 and to obtain the timing of a response packet.

Figure 13:
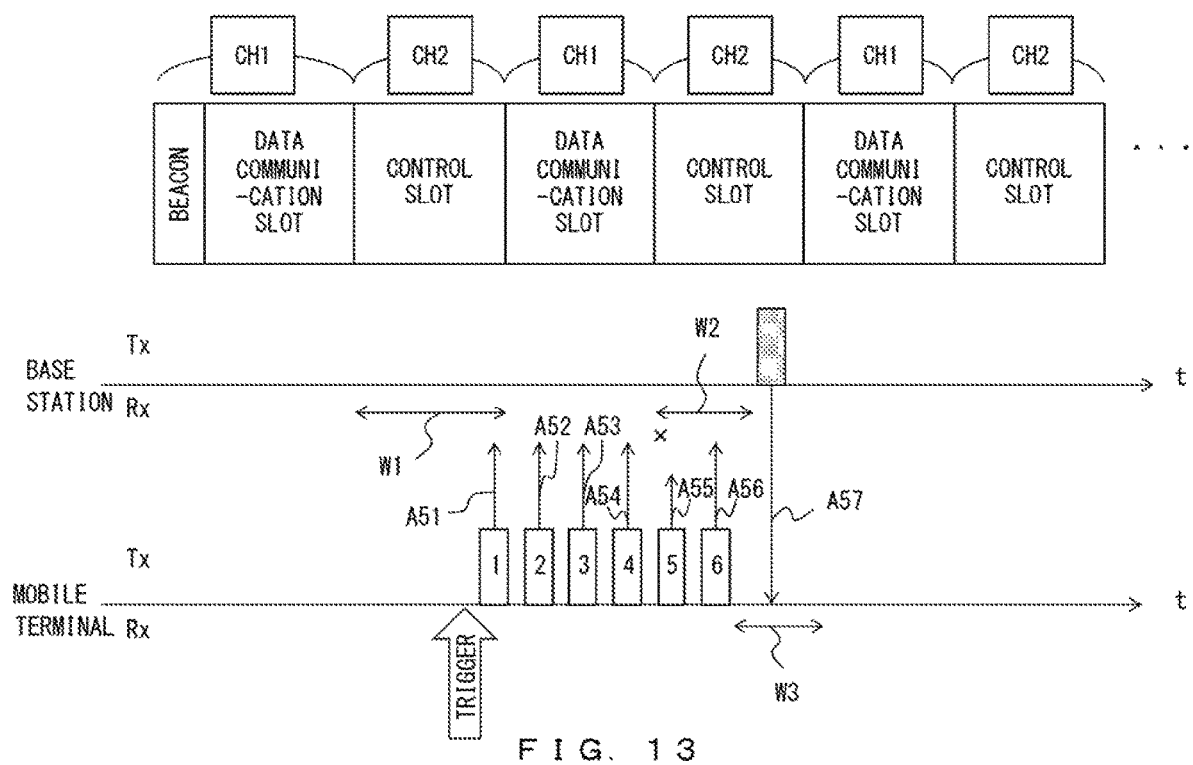
FIG. 13 illustrates an example of a communication conducted in a second embodiment.

FIG. 13 illustrates an example of a communication conducted in the second embodiment. By referring to FIG. 13, explanations will be given for a case where the number of times of continuous transmission N=6. It is assumed, similarly to the first embodiment, that the base station 10 is waiting for reception of a packet from the mobile terminal 40 during waiting periods w1 and w2 and the mobile terminal 40 is waiting for reception of a response packet from the base station 10 during waiting period w3.

In response to the occurrence, in the mobile terminal 40, of a trigger to start a communication, a packet is transmitted from mobile terminal 40 at frequency F2 as represented by arrow A51. In this example, it is assumed that sequence number=1 is contained in the packet transmitted at arrow A51.

The reception packet process unit 22 in the base station 10 obtains the packet via the communication unit 11 and the demodulation unit 12. The reception packet process unit 22 outputs the sequence number to the determination unit 24. It is assumed that the determination unit 24 holds the number of times of continuous transmission N in advance. In accordance with a difference between the number of times of continuous transmission N and the sequence number contained in the reception packet, the determination unit 24 determines a waiting time that is a time taken before transmission of a response packet. For example, the determination unit 24 can obtain waiting time $\Delta T$ from formula (2), where N is the number of times of continuous transmission of packets from the mobile terminal 40, sn is a sequence number in a reception packet and k is the length of a time taken for the base station 10 to receive one packet. Further, i is a transmission interval of packets.

$$\Delta T = (N-sn) \times (k+i) \qquad (2)$$

It is assumed that after the base station 10 received a packet transmitted at arrow A51, a data communication slot started in the base station 10. The base station 10 changes the frequency used for a communication with a device to which the base station 10 has a connection from frequency F2 to frequency F1. Accordingly, the packets transmitted at arrow A52 through arrow A54 are not received by the base station 10.

It is assumed that because a control slot thereafter started in the base station 10, the base station 10 changed the frequency used for a communication from frequency F1 to frequency F2. After the frequency to be used is changed to frequency F2, the base station 10 can receive a packet transmitted from the mobile terminal 40.

It is assumed that while the mobile terminal 40 transmitted a packet with sequence number=5 at arrow A55, the packet transmitted at arrow A55 did not arrive at the base station 10. Because waiting time $\Delta T$ has not elapsed since the reception time of the previous packet although a time (threshold Th) taken between the reception of a last packet from the mobile terminal 40 and the transmission of the next packet toward the base station 10 has elapsed, the determination unit 24 waits without transmitting a response packet.

At arrow A56, the base station 10 receives a packet with sequence number=6 from the mobile terminal 40. The reception packet process unit 22 and the determination unit 24 perform processes similar to those performed when a packet is received at arrow A51. In this example, because the number of times of continuous transmission N=6, the determination unit 24 calculates new waiting time $\Delta T$ from the following formula. Thereby, the determination unit 24 determines to transmit a response packet, and makes a request to the transmission packet generation unit 25 for transmission of a response packet.

$$\Delta T=(N-sn)\times(k+i)=(6-6)\times(k+i)=0$$

Because the processes of the transmission packet generation unit 25 are similar to those in the first embodiment, a response packet is transmitted to the mobile terminal 40 as represented by arrow A57.

In the second embodiment, a waiting time before the base station 10 uses the sequence number in a packet so as to transmit a response packet is calculated. This makes it possible for the determination unit 24 of the base station 10 to determine whether or not there is a possibility that a packet will be transmitted from the mobile terminal 40, even when some of the packets transmitted from the mobile terminal 40 have not arrived at the base station 10. In the second embodiment, the base station 10 transmits a response packet after termination of the transmission of a packet from the mobile terminal 40, which reduces a possibility that a packet transmitted from the mobile terminal 40 and a response packet collide with each other so as to cause a failure of a communication. Further, similarly to the first embodiment, it is possible in the second embodiment as well for the mobile terminal 40 to receive a response packet so as to obtain the report data 33 and thereby to process the report data 33 at an early stage. Thereby, when emergency data is reported as the report data 33 in a response packet, that emergency data can be applied earlier. Also, a connection between the base station 10 and the mobile terminal 40 is established through a response packet, so a time taken to start a communication is also reduced.

Figure 14:
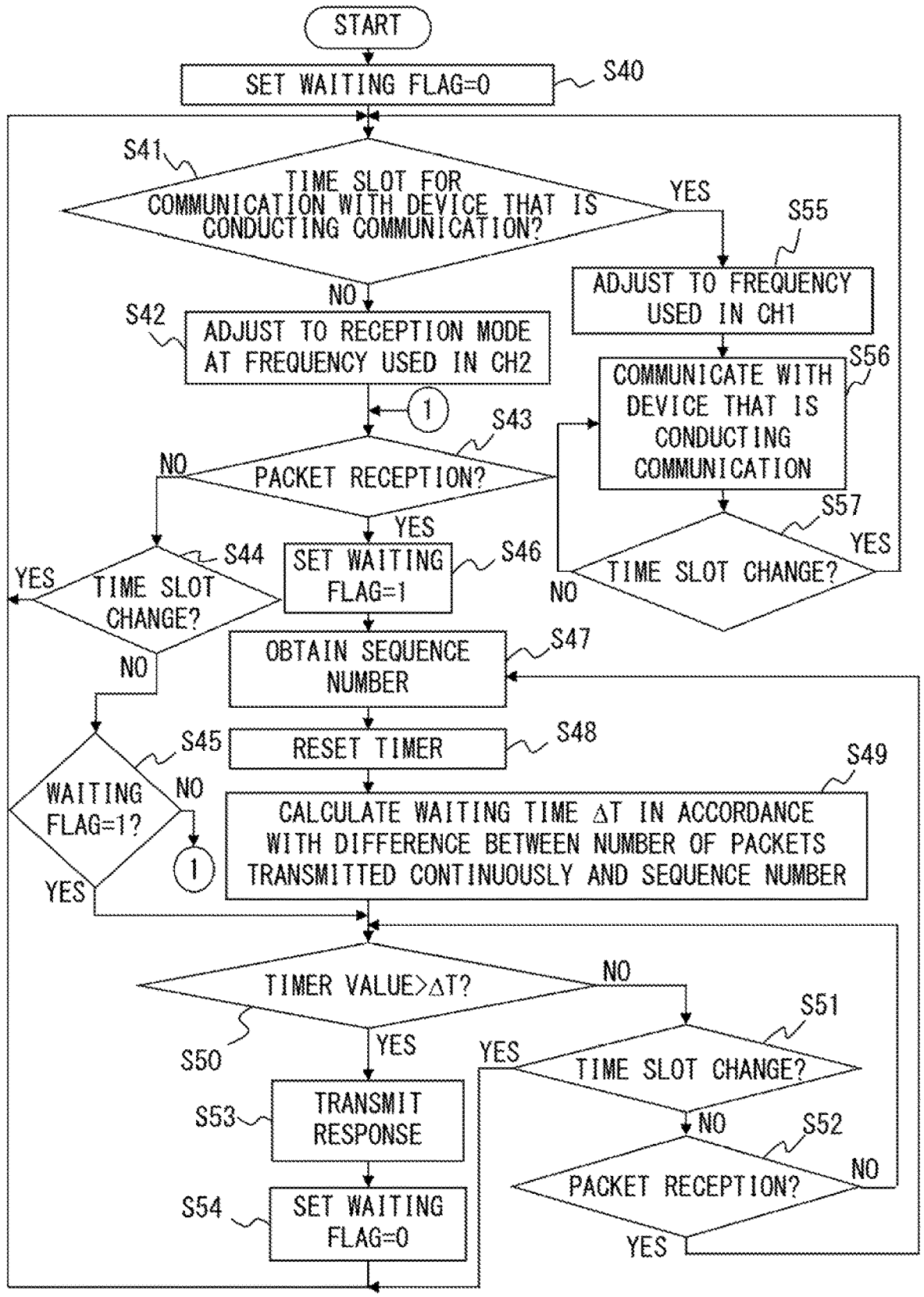
FIG. 14 is a flowchart illustrating an example of a process performed by the base station.

FIG. 14 is a flowchart illustrating an example of a process performed by the base station 10. It is assumed in the example illustrated in FIG. 14 that the determination unit 24 holds a waiting flag. A waiting flag indicates whether or not the base station 10 is waiting for transmission up to the timing for transmitting a response packet after receiving a packet in a control slot. Waiting flag=0 indicates that the base station 10 is not waiting for transmission because a packet triggering for transmission of a response packet has not bee received. Waiting flag=1 indicates that a packet triggering for transmission of a response packet has been received and the base station 10 is waiting in order to transmit a response packet when the value measured by the timer 23 becomes greater than waiting time ΔT.

The determination unit 24 sets the waiting flag so that waiting flag=0 (step S40). The processes in step S41 through step S43 are similar to those in step S1 through step S3 explained in FIG. 9. The processes in step S55 through step S57 are also similar to those in step S10 through step S12 (FIG. 9).

When the base station 10 receives a packet, the determination unit 24 performs setting so that waiting flag=1 and obtains the sequence number contained in the reception packet from the reception packet process unit 22 (YES in step S43 and proceed to step S46 and step S47). Further, the determination unit 24 resets the timer 23 (step S48). The determination unit 24 calculates waiting time ΔT in accordance with a difference between the number of packets that are transmitted continuously N and the sequence numbers contained in the received packets (step S49). When the value measured by the timer 23 exceeds waiting time ΔT, the base station 10 transmits a response packet through a process by the transmission packet generation unit 25 (YES in step S50 and proceed to step S53). Further, the determination unit 24 performs setting so that waiting flag=0 (step S54).

When the value measured by the timer 23 is smaller than waiting time ΔT, the setting unit 21 determines whether or not a time slot is changed (NO in step S50 and proceed to step S51). When a time slot is changed, the processes in and after step S41 are repeated (YES in step S51). When a time slot is not changed, the reception packet process unit 22 determines whether or not a packet has been received (NO in step S51 and proceed to step S52). When the base station 10 has not received a new packet, the processes in and after step S50 are repeated (NO in step S52). When the base station 10 has received a new packet, the processes in and after step S47 are repeated (YES in step S52).

When it is determined in step S43 that a packet has not been received, the setting unit 21 determines whether or not a time slot is changed (step S44). When a time slot is changed, the processes in and after step S41 are repeated (YES in step S44). When a time slot is not changed, the determination unit 24 determines whether or not waiting flag=1 (No in step S44 and proceed to step S45). When waiting flag=1, the process in and after step S50 are repeated (YES in step S45). When waiting flag=0, the processes in and after step S43 are repeated (NO in step S45).

Note that FIG. 14 is just an example of a process. For example, the base station 10 may receive modification so that it returns to step S50 without performing the determination process in step S52 when the determination result is No in step S51. In such a case, a waiting time is not calculated again by using a new packet, reducing process loads on the base station 10.

Third Embodiment

Next, explanations will be given for a case where a timing for transmitting a response packet is changed in accordance with the communication condition in order to prevent a connection from being generated between the mobile terminal 40 and the base station 10 that is not in an good communication condition with the mobile terminal 40 such as in a case where base stations are concentrated densely.

It is assumed in the third embodiment that the mobile terminal 40 treats as a process target the response packet that it received the first after transmission of a packet for establishing a communication, in order to reduce a time taken before a communication starts. In other words, when receiving a plurality of response packets, the mobile terminal 40 performs a process by the application process unit 52 by using the report data 33 contained in the response packet received first, and does not use report data reported in the other response packets. Further, while the mobile terminal 40 generates a connection to the base station 10 as the transmission source of the response packet that the mobile terminal 40 first received, the mobile terminal 40 does not conduct communications with the other base stations 10.

Figure 15:
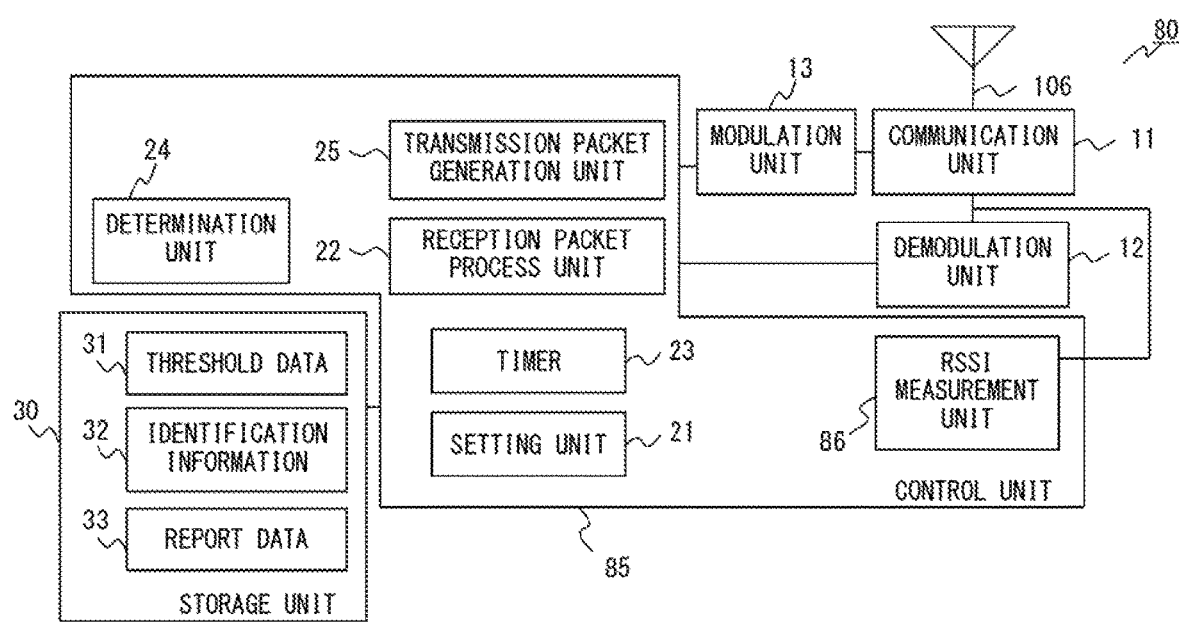
FIG. 15 illustrates an example of a configuration of a base station used in a third embodiment.

FIG. 15 illustrates an example of a configuration of a base station 80 used in the third embodiment. The base station 80 includes the communication unit 11, the demodulation unit 12, the modulation unit 13, the storage unit 30, a control unit 85 and the antenna 106. The control unit 85 further includes an RSSI (Received Signal Strength Indication) measurement unit 86, and further includes the setting unit 21, the reception packet process unit 22, the timer 23, the determination unit 24 and the transmission packet generation unit 25. The storage unit 30 stores identification information 32 in addition to the threshold data 31 and the report data 33.

The RSSI measurement unit 86 uses a reception signal received by the communication unit 11 so as to increase the strength of the reception signal. The determination unit 24 determines a timing for transmitting a response packet on the basis of whether or not the strength of the reception signal obtained by the RSSI measurement unit 86 is greater than threshold Th2.

The identification information 32 is information of the mobile terminal 40 that has a high possibility of being connected to the base station 10. For example, in the practice system explained in FIG. 11, for each of the firearms that operate as the mobile terminals 40, identification information of the user who uses such a firearm is stored. Also, the base station 10 is worn by each user. Because each user basically uses his or her firearm in many cases, there is a high possibility that the base station 10 conducts a communication with a mobile terminal 40 that is associated with the user wearing that base station. Accordingly, the base station 10 stores, as identification information 32, identification information held by the mobile terminal 40 that is associated with the user wearing the base station 10. For example, when the identification information of user Y is stored in the mobile terminal 40y, the base station 10y stores the identification information of user Y as the identification information 32.

The processes performed by the setting unit 21, the reception packet process unit 22, the timer 23, the determination unit 24, the transmission packet generation unit 25, the communication unit 11, the demodulation unit 12 and the modulation unit 13 are similar between the third and first embodiments. Note that the base station 80 as well can be implemented by the hardware illustrated in FIG. 6. In such a case, the control unit 85 is implemented by the processor 103.

Figure 16:
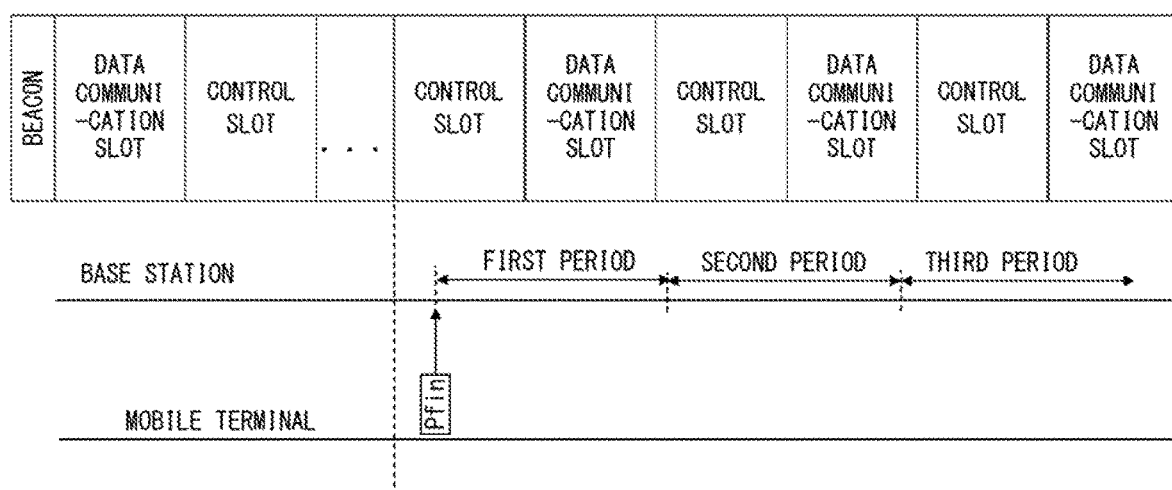
FIG. 16 illustrates an example of a method of determining a period during which the base station can transmit a connection response in the third embodiment.

FIG. 16 illustrates an example of a method of determining a period during which the base station 80 can transmit a connection response in the third embodiment. In FIG. 16, Pfin represents a packet that was transmitted last among packets transmitted by the mobile terminal 40 for establishing a communication with the base station 10. It is assumed that a packet transmitted by the mobile terminal 40 for establishing a communication with the base station 10 contains identification information for identifying one of the mobile terminals 40 or the users of the mobile terminals 40.

The determination unit 24 compares the identification information contained in the packet received from the mobile terminal 40 with the identification information 32. When the identification information contained in the received packet is identical with the identification information 32, the determination unit 24 determines to transmit a response packet when communications with the mobile terminal 40 are possible during the first period illustrated in FIG. 16. In this example, the first period is a period between a reception time of the last one of the packets transmitted continuously from the mobile terminal 40 and a moment when a prescribed time has elapsed since the reception time. Note that the lengths of the first through third periods are stored in each base station 80.

When the identification information contained in the received packet is not identical with the identification information 32, the determination unit 24 further uses the result of the comparison between the measurement result and threshold Th in the RSSI measurement unit 86 so as to determine a timing for transmitting a response packet. In this example, threshold Th2 is a minimum value as a reception strength that can be considered to allow communications in a good condition. Accordingly, it can be considered that communications will be conducted in a good condition between the base station 80 with the measurement result by the RSSI measurement unit 86 greater than threshold Th2 and the mobile terminal 40. Accordingly, when identification information 32 is not contained in a reception packet and the reception strength of the signal is greater than threshold Th2, the determination unit 24 determines to transmit a response packet to the mobile terminal 40 in the control slot in the second period in FIG. 16. In this example, a second period is a period between the ending time of the first period and a moment when a time stored in the determination unit 24 as the length of the second period has elapsed since the ending time.

When the identification information 32 is not contained in the reception packet and the reception strength of the signal is equal to or smaller than threshold Th2, the determination unit 24 determines to transmit a response packet to the mobile terminal 40 in the control slot of the third period in FIG. 16. In this example, a third period is a period between the ending time of the second period and the moment when a time stored in the determination unit 24 as the length of the third period has elapsed since the ending time.

It is assumed for example that three base stations exist in an area in which they can receive packets from the mobile terminal 40 as illustrated in FIG. 3. In this example it is assumed that the base stations 80a through 80c are located in the BANs of B1 through B3, respectively. It is assumed further that the mobile terminal 40 is located as mobile terminal 40T3. It is assumed also that the identification information 32c stored in the base station 80c is identical with the identification information of the mobile terminal 40. It is assumed that the mobile terminal 40 in this situation transmitted as many packets containing the identification information of the mobile terminal 40 as specified by the number of times of continuous transmission N in order to establish a connection to one of the base stations.

Because the base station 80c holds the identification information of the mobile terminal 40 as the identification information 32c, the base station 80c transmits a response packet to the mobile terminal 40 in the first period in FIG. 16. It is assumed that the base station 80b does not hold the identification information of the mobile terminal 40 and the RSSI obtained by the RSSI measurement unit 86b is greater than threshold Th2. Then, the base station 80b transmits a response packet to the mobile terminal 40 in the second period. Meanwhile, it is also assumed that the base station 80a does not hold the identification information of the mobile terminal 40 and the RSSI obtained by the RSSI measurement unit 86a is equal to or smaller than threshold Th2. Then, the base station 80a transmits a response packet to the mobile terminal 40 in the third period. Accordingly, response packets are transmitted to the mobile terminal 40 from the base stations 80c, 80b and 80a in this order. Accordingly, a possibility that the mobile terminal 40 will process the report data 33c in the response packet transmitted from the base station 80c is higher than a possibility that the mobile terminal 40 will process the data reported from the base stations 80b and 80a. Also, among the base stations 80a through 80c, the base station 80c has the highest possibility of establishing a connection to the mobile terminal 40. Even when the reception of the response packet from the base station 80c fails, the mobile terminal 40 can conduct communications by using the base station 80b, which is in a communication condition better than that of the base station 80a, when the mobile terminal 40 can receive a response packet from the base station 80b.

Figure 17:
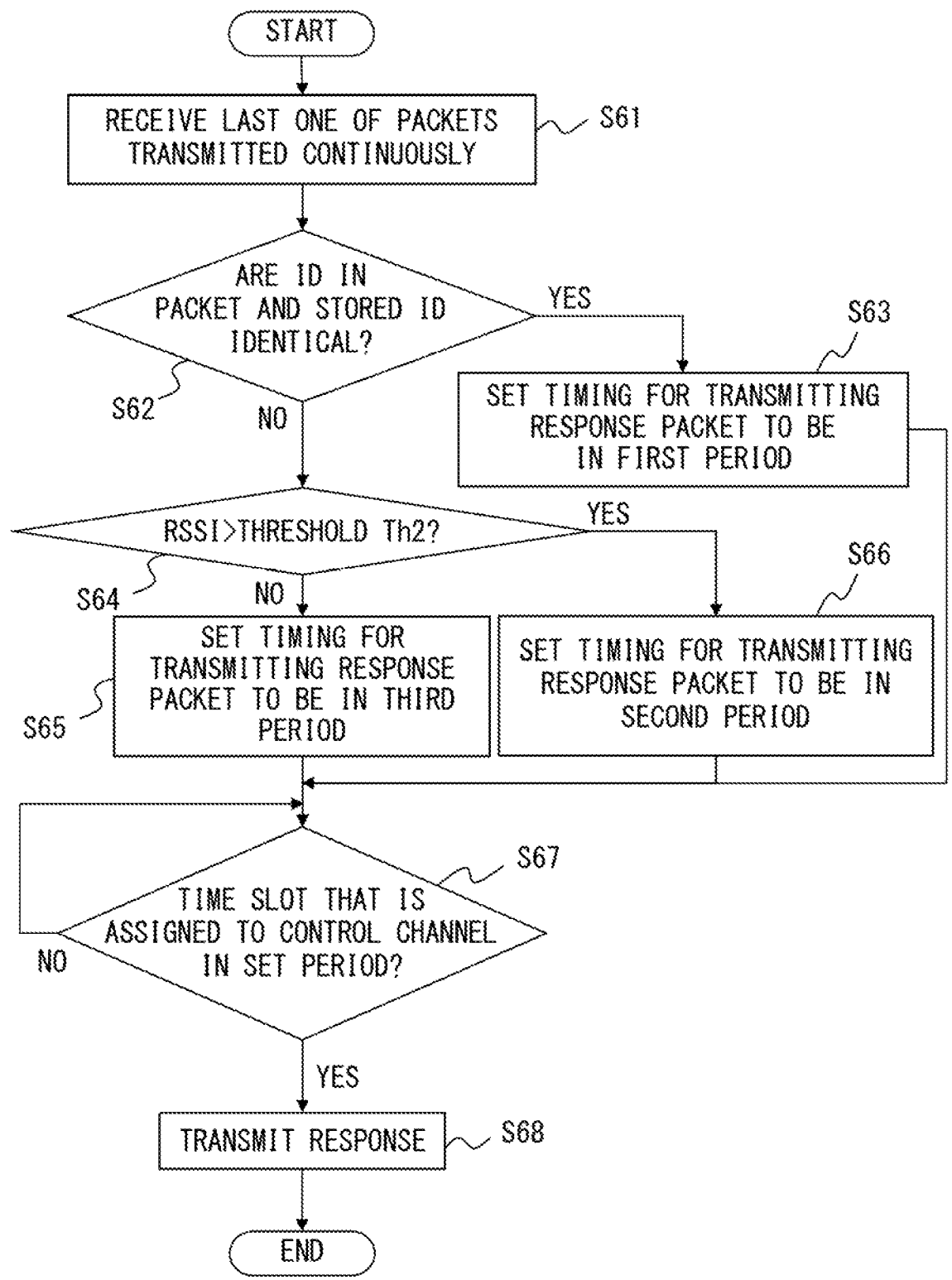
FIG. 17 is a flowchart illustrating an example of a process performed by the base station.

FIG. 17 is a flowchart illustrating an example of a process performed by the base station 80 for determining a timing for transmitting a response packet. It is assumed that the base station 80 received the last one of the packets that were transmitted continuously from the mobile terminal 40 (step S61). The determination unit 24 determines whether or not the identify information (ID) contained in the reception packet and information stored as the identification information 32 are identical (step S62). When the identification information in the reception packet and the identification information 32 are identical, the determination unit 24 sets the timing for transmitting a response packet to be in the first period (YES in step S62 and proceed to step S63). When the identification information in the reception packet and the identification information 32 are not identical but the RSSI is greater than threshold Th2, the determination unit 24 sets the timing for transmitting a response packet to be in the second period (NO in step S62, YES in step S64 and proceed to step S66). When the identification information in the reception packet and the identification information 32 are not identical and the RSSI is equal to or smaller than threshold Th2, the determination unit 24 sets the timing for transmitting a response packet to be in the third period (NO in step S62, NO in step S64 and proceed to step S65). The determination unit 24 makes a request to the transmission packet generation unit 25 for transmission of a response packet in a time slot assigned to the control channel in the set period (step S67). In response to the request from the determination unit 24, the transmission packet generation unit 25 transmits a response packet to the mobile terminal 40 via the communication unit 11 and the modulation unit 13 (step S68).

FIG. 18 illustrates an example of communication procedures avoided by the third embodiment. It is assumed that SF3 is a superframe used by base station W and SF4 is a superframe used by base station Z. It is assumed that base station Z is located closer to the mobile terminal 40 than is base station W.

It is assumed that as represented by arrow A61, the mobile terminal 40 transmitted the last packet (Pfin) as one of the packets transmitted for making a request for the establishment of a communication. It is assumed that packet Pfin was received by both base station W and base station Z. As illustrated in FIG. 18, the control slots have different ending times between SF3 and SF4, and thus a control slot ends immediately after the reception of packet Pfin in base station Z, but a communication using a control slot is possible in base station W even after the reception of packet Pfin. When the third embodiment is not applied, base station W, which is more distant from the mobile terminal 40, transmits a response packet to the mobile terminal 40 before base station Z as represented by arrow A62 and arrow A63. This may lead to a situation where base station W has a higher possibility of conducting a communication with the mobile terminal 40 than that of base station Z so that the mobile terminal 40 conducts a communication with a base station that is not in the most appropriate communication condition. Further, in the practice system as illustrated in FIG. 11, there is also a risk that while user A is doing practice by using a firearm assigned to user A, user B existing near user A is mistaken to be using the firearm of user A.

Also, because the third embodiment causes the base stations 80 to select one of the first through third periods to transmit response packets in, timings for transmitting response packets are not likely to occur at the same time even when a plurality of base stations 80 are located near the mobile terminal 40. This reduces a possibility that transmission of a response packet fails due to interference. Further, in the third embodiment, the base station 80 to which to establish a connection with a priority is determined by using identification information, making it easier to succeed in associating the mobile terminals 40 and the base stations 80 even when a plurality of users are concentrated densely such as in cases of practice systems, games, etc. Also, the base station 80 with the RSSI greater than threshold Th2 transmits a response packet before the base station 80 with the RSSI equal to or smaller than threshold Th2, making it easier to establish a communication between a base station in an good communication condition and the mobile terminal 40 in the third embodiment.

Variation Example

Figure 19:
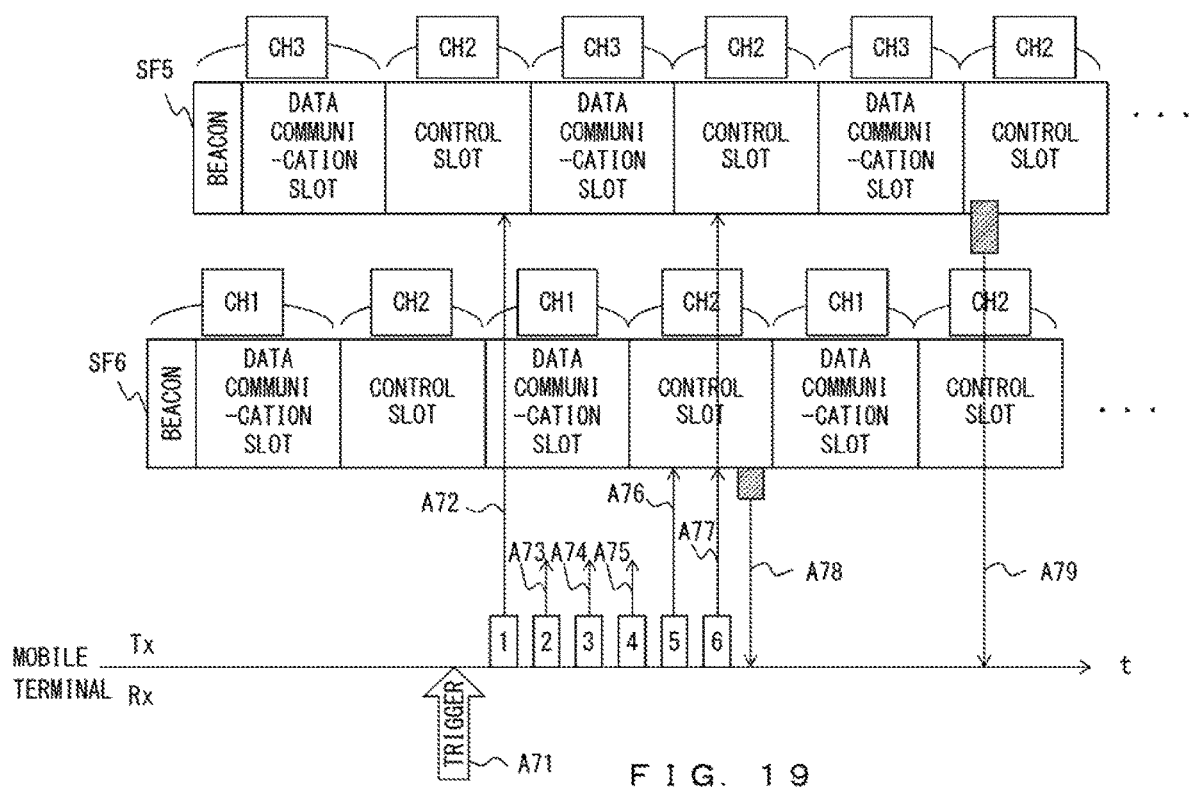
FIG. 19 illustrates an example of a communication conducted in a case when the second and third embodiments are combined.

FIG. 19 illustrates an example of a communication conducted in a case when the second and third embodiments are combined. It is assumed that the base stations 80a and 80b are located near the mobile terminal 40 and the base station 80b stores the identification information of the mobile terminal 40 as the identification information 32b. It is also assumed that the base station 80a uses the superframe represented as SF5 and the base station 80b uses the superframe represented as SF6. Further, in data communication slots, the base station 80a uses channel CH3 (frequency F3) and the base station 80b uses channel CH2 (frequency F2) in order to conduct, without interference, communications with devices to which they are connected. Note that FIG. 19 illustrates an example where the number of times of continuous transmission N is six.

When a trigger for packet transmission has occurred as represented by arrow A71, the trigger generation unit 53 makes a request to the transmission packet generation unit 54 for transmission of a packet in the mobile terminal 40. It is assumed that the mobile terminal 40 transmitted packets with sequence numbers 1 through 5 as represented by arrow A72 through arrow A76 in response to the process by the transmission packet generation unit 54. In the example of FIG. 19, it is assumed that the base station 80a received the packet with sequence number 1 as represented by arrow A72. It is also assumed that the base station 80b received the packet with sequence number 5 as represented by arrow A76.

Upon receiving the packet with sequence number 1, the determine unit 24a of the base station 80a determines one of the first through third periods as a period in which to transmit a reception to the mobile terminal 40, in a process similar to the process in the third embodiment. It is assumed herein that the determine unit 24a determined to transmit a response packet in the second period. Next, the reception time of the last one packet (Pfin) of the packets transmitted continuously from the mobile terminal 40 is predicted. The method of predicting the reception time of packet Pfin is similar to that in the second embodiment. Further, the determine unit 24a uses the reception time of packet Pfin and the lengths of the first and second periods so as to determine a period in which a response packet can be transmitted.

Similarly to the determine unit 24a, upon receiving the packet with sequence number 5, the determine unit 24b of the base station 80b as well obtains a period in which a response packet can be transmitted. It is assumed herein that the determine unit 24b determined to transmit a response packet in the first period.

In neither of the base stations 80a nor 80b, a response packet is transmitted before a time predicted as the reception time of packet Pfin (sequence number=6) has elapsed. This makes it possible for both of the base stations 80a and 80b to receive a packet transmitted at the timing represented by arrow A77 (packet with sequence number 6).

As represented by arrow A78, the base station 80b transmits a response packet to the mobile terminal 40 after receiving the packet with sequence number 6 from the mobile terminal 40 and before the end of the first period. Meanwhile, the base station 80a transmits a response packet to the mobile terminal 40 in the second period (arrow A79). This makes it possible for the base station 80b to transmit a response packet to the mobile terminal 40 earlier than the base station 80a. Accordingly, the base station 80b storing the same identification information 32 as the identification information in a packet transmitted from the mobile terminal 40 can transmit a response packet to the mobile terminal 40 earlier than the base station 80a even when the base station 80b has received a packet from the mobile terminal 40 later than the base station 80a. Therefore, the possibility that the mobile terminal 40 will process the report data 33b transmitted from the base station 80b is higher than the possibility that the mobile terminal 40 will process the report data 33a transmitted from the base station 80a. Further, it is easier for the base station 80b than for the base station 80a to establish a connection to the mobile terminal 40. Also, interference that would be caused by transmission of response packets by the base stations 80a and 80b in the same period can be avoided.

Fourth Embodiment

In the fourth embodiment, an example will be explained where the length of a data communication slot in a superframe is changed in accordance with the number of devices conducting communications with the base station, the priority of data that is transmitted and received, etc.

FIG. 20 illustrates an example of a configuration of a base station 90 used in the fourth embodiment. The base station 90 includes the communication unit 11, the demodulation unit 12, the modulation unit 13, a control unit 91, a storage unit 93, and the antenna 106. The control unit 91 includes an SF (superframe) update determination unit 92, and further includes the setting unit 21, the reception packet process unit 22, the timer 23, the determination unit 24 and the transmission packet generation unit 25. The storage unit 93 stores the threshold data 31, the report data 33 and a communication condition data 94. Note that the processes by the communication unit 11, the demodulation unit 12, the modulation unit 13, the setting unit 21, the reception packet process unit 22, the timer 23 and the determination unit 24 are similar to those in the first through third embodiments.

The communication condition data 94 is the number of devices that are conducting communications with the base station 90 using data communication slots, the priority of data transmitted and received using data communication slots, the traffic rate of data transmitted and received using data communication slots, etc. It is assumed that the reception packet process unit 22 appropriately updates the communication condition data 94 when processing a reception packet.

The SF update determination unit 92 monitors the value of the communication condition data 94 and determines whether or not to change the length of each slot in the superframe, in accordance with a result of a comparison with a threshold stored as the threshold data 31.

Figure 21:
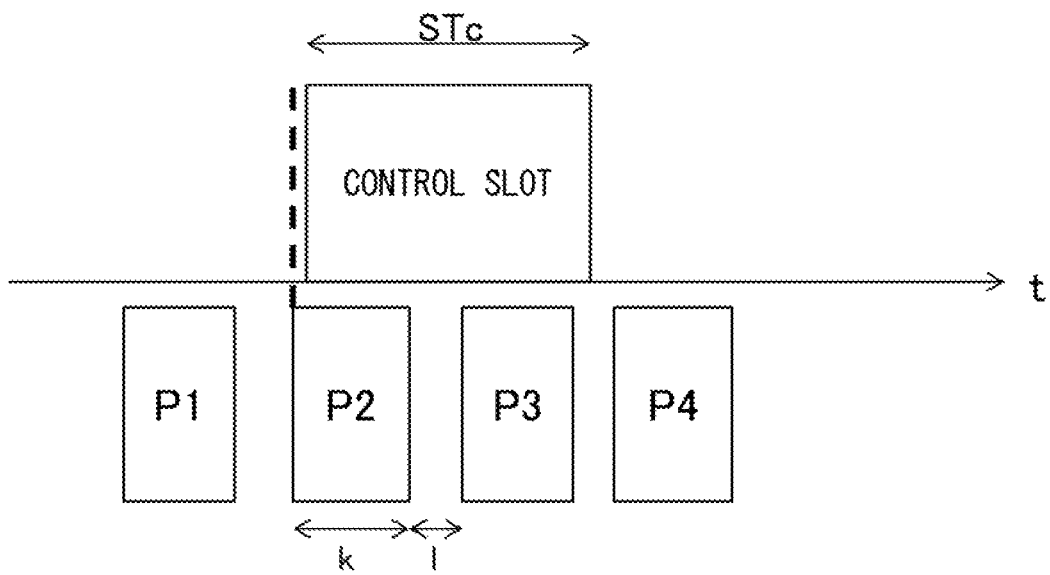
FIG. 21 illustrates an example of a method of adjusting the length of a control slot.

FIG. 21 illustrates an example of a method of adjusting the length of a control slot. Packets P1 through P4 in FIG. 21 are packets transmitted by the mobile terminal 40 for starting communications. The length of the control slot is adjusted so that at least one packet can be received even when packets are transmitted from the mobile terminal 40 at worst timings. In a case when the timing is the worst, the base station 90 fails in receiving packet P2 because the control slot starts immediately after the arrival of the leading portion of packet P2 transmitted from the mobile terminal 40 as illustrated in FIG. 21. In such a case, when the base station 90 can receive packet P3, which is next transmitted from the mobile terminal 40, a communication is made possible between the mobile terminal 40 and the base station 90. Thus, time STc of a control slot can be represented by formula (3), where k is the length of a time taken for the base station 10 to receive one packet and i is a transmission interval of packets that are being transmitted continuously.

$$STc > 2k+i \qquad (3)$$

It is assumed that the SF update determination unit 92 changes the lengths of a control slot and a data communication slot so that the sum of one control slot and one data communication slot is constant. In other words, the total value (Tsum) of the length of a control slot (STc) and the length of a data communication slot (STd) is a constant value. Then, the length of a data communication slot can be represented by formula (4).

$$STd = Tsum - STc < Tsum - (2k+i) \qquad (4)$$

Thus, the SF update determination unit 92 obtains the length of a data communication slot in such a manner that formula (4) is satisfied.

Figure 22:
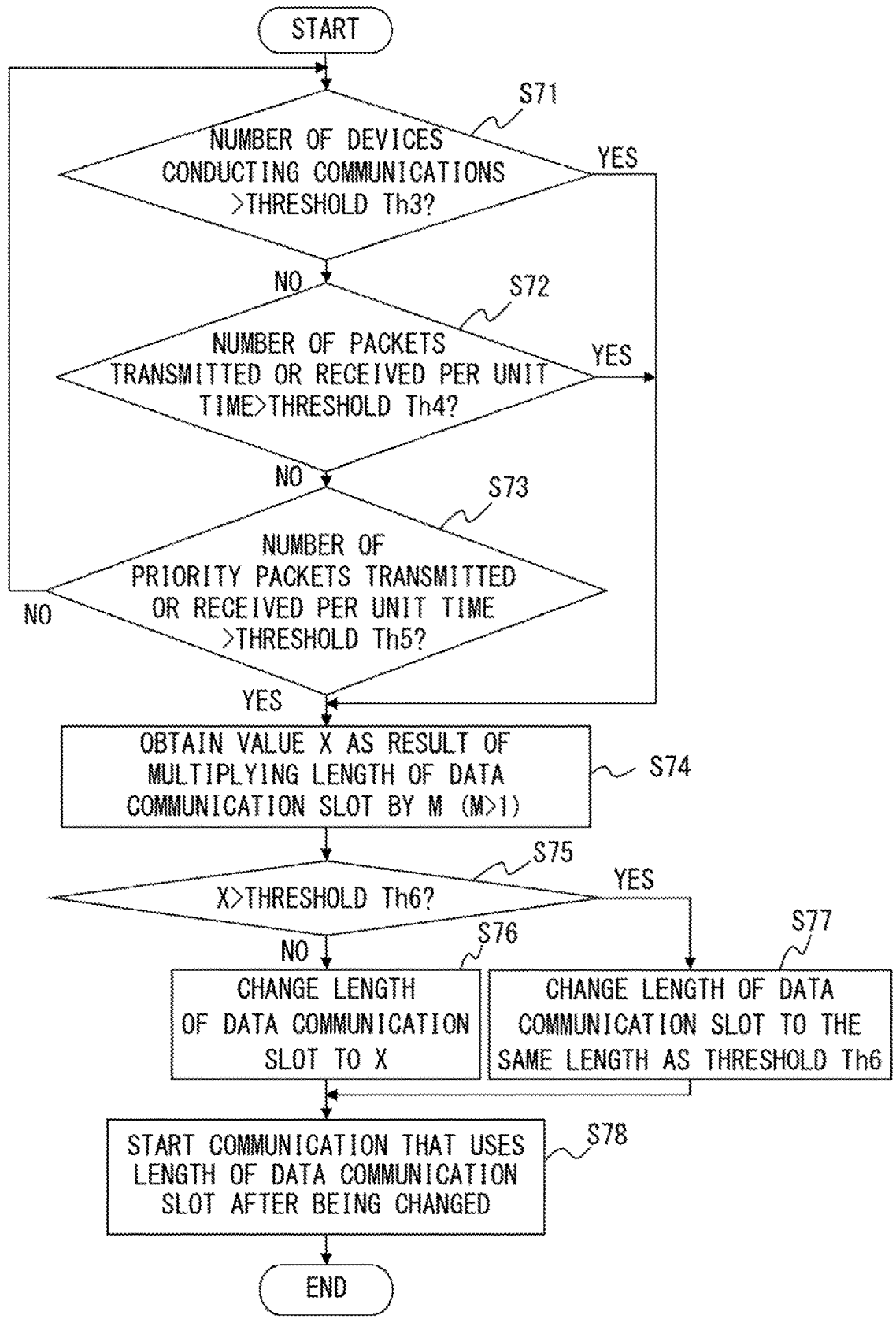
FIG. 22 is a flowchart illustrating an example of a process performed by an SF update determination unit.

FIG. 22 is a flowchart illustrating an example of a process performed by the SF update determination unit 92. It is assumed in the explanations below that thresholds Th3 through Th6 used by the SF update determination unit 92 are stored as the threshold data 31 similarly to thresholds Th and Th2.

The SF update determination unit 92 determines whether or not the number of devices that are conducting communications with the base station 90 has exceeded threshold Th3 (step S71). When the number of devices that are conducting communications with the base station 90 is equal to or smaller than threshold Th3, the SF update determination unit 92 determines whether or not the number of packets transmitted or received per unit time has exceeded threshold Th4 (No in step S71 and proceed to step S72). When the number of packets transmitted or received per unit time is equal to or smaller than threshold Th4, the SF update determination unit 92 determines whether or not the number of priority packets transmitted or received per unit time has exceeded threshold Th5 (NO in step S72 and proceed to step S73). When the number of priority packets transmitted or received per unit time is equal to or smaller than threshold Th5, the SF update determination unit 92 determines to not change the time slot in the superframe and returns to step S71 (NO in step S73).

When one of the determination results in step S71 through step S73 is YES, the SF update determination unit 92 determines to change the length of a slot in the superframe. Then, the SF update determination unit 92 obtains value (X), which is a result of multiplying the length of a data communication slot by M (step S74). It is assumed that M is an arbitrary number greater than one. The SF update determination unit 92 determines whether or not X has exceeded threshold Th6 (step S75). Threshold Th6 is the maximum length of a data communication slot and is calculated by using formula (4) etc. The SF update determination unit 92 sets the length of a data communication slot to X when X is equal to or smaller than threshold Th6 (No in step S75 and proceed to step S76). When X has exceeded threshold Th6, the SF update determination unit 92 adjusts a data communication slot to the same length as threshold Th6 (Yes in step S75 and proceed to step S77). Further, the SF update determination unit 92 changes the length of a control slot as well in accordance with the change of the length of the data communication slot so as to start a communication that uses the slots after being changed (step S78).

Although explanations have been given for a process in a case where the length of a data slot for communication is extended by referring to FIG. 22, the SF update determination unit 92 may shorten the length of a data slot for communication in a similar manner. For example, the SF update determination unit 92 can also shorten a data communication slot when the number of terminal devices with which the base station is conducting communications, the number of packets transmitted or received in a unit time between the base station 90 and the mobile terminal 40, etc., has fallen below a prescribed threshold. Also, the criteria for determining whether or not to change the length of a data slot for communication may arbitrarily be changed in accordance with the implementation. Further, thresholds Th3 through Th5 and a threshold used for determining whether or not to shorten the length of a data slot for communication may also be set in accordance with the implementation.

Figure 23:
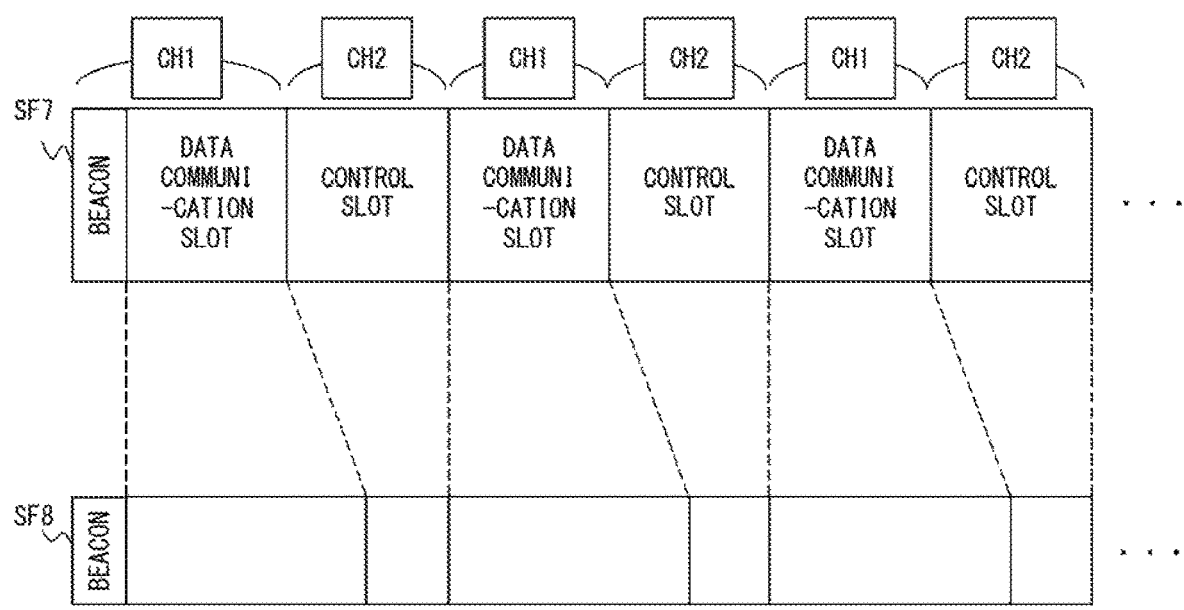
FIG. 23 illustrates an example of a superframe used in the fourth embodiment.

FIG. 23 illustrates an example of a superframe used in the fourth embodiment. For example, when the base station 90 is conducting a communication by using the superframe represented as SF7, the SF update determination unit 92 can change the superframe to the superframe represented as SF8 for reasons such as one that the number of devices conducting communications with the base station 90 has increased to a value greater than threshold Th3. By changing a superframe, the base station 90 can increase the amount of communications with devices that it is conducting communications with. When a decrease in the number of terminal devices conducting communications with the base station 90 etc., decreases the amount of communications using data communication slots, the SF update determination unit 92 changes the superframe used by the base station 90 from SF8 to SF7. When a change between superframes changes the timing for a communication with a device that is conducting a communication, the change of the timing for a communication is reported to each device that is conducting a communication with the base station 90, through the beacon added to the leading portion of a superframe.

Fifth Embodiment

In a case where the number of base stations located in a range over which the mobile terminal 40 can receive a notification signal is small, even when abase station transmits a notification signal, a communication is highly likely to fail due to interference with a notification signal transmitted from a different base station. Accordingly, when the number of nearby base stations 10 is small and the base stations 10 transmit emergency data to the mobile terminals 40 as in a case of a target practice system, each base station can transmit emergency data together with notification signals. Hereinafter, while explanations will be given for a target practice system as an example, the fifth embodiment can also be applied to systems other than a target practice system, such as a game system. In the explanations below, it is assumed that base stations 10x and 10y transmit information indicating whether or not the users are eligible to emit valid laser beams as emergency data.

FIG. 24 illustrates an example of a communication conducted in the fifth embodiment. It is assumed herein that user X is wearing a BAN including the base station 10x and an arbitrary number of terminal devices 5 that conduct communications with the base station 10x. It is assumed similarly to FIG. 11 that the terminal devices 5 are optical receivers and mobile terminal 40x is a firearm that can emit a laser beam for realizing simulated shooting. It is also assumed that mobile terminal 40x is assumed to be used by user X. It is also assumed that the BAN worn by user Y includes the base station 10y. For a prescribed period, the mobile terminal 40x obtains a value indicating the communication condition such as RSSI etc., for each of the base stations 10 that can receive notification signals and conducts a communication with the base station 10 in a relatively good communication condition.

At arrow A81, the base station 10y transmits a notification signal containing information indicating that user Y is eligible to emit a valid laser beam. The reception packet process unit 51x of the mobile terminal 40x stores, in the storage unit 60 as base station data 62x, information contained in the notification signal received from the base station 10y. It is assumed that the report data 33 transmitted from each base station and information representing a communication condition with each base station are associated with the identifiers of the base stations in the base station data 62x.

At arrow A82, the base station 10x transmits a notification signal containing information indicating that user X is eligible to emit a valid laser beam. The reception packet process unit 51x of the mobile terminal 40x performs a process similar to a process on a notification signal received from the base station 10y, and thus information of a notification signal received from the base station 10x is added to the base station data 62x. Also at arrow A83 and arrow A84, a process using notification information transmitted from the base stations 10y and 10x is performed similarly.

When a prescribed time ends, the reception packet process unit 51x of in the mobile terminal 40x uses the base station data 62x so as to output, to the application process unit 52x, the report data 33 obtained from a base station that is in a relatively good communication condition. Note that when a plurality of notification signals are received from the same base station as illustrated in FIG. 24, information about the latest notification signal may be used for determination. Also, as for a value indicating a reception condition such as RSSI, determination may be made by using an average value of a plurality of notification signals. The application process unit 52x processes the report data 33.

It is assumed for example that because RSSI from the base station 10x is greater than RSSI obtained by using a notification signal from the base station 10y, the report data 33x reported from the base station 10x is output to the application process unit 52x. Then, the application process unit 52x determines that user X is eligible to perform shooting by using valid laser beams and causes emission of laser beams when user X performs shooting.

In parallel to a process in the application process unit 52x and shooting by the user, the mobile terminal 40x can appropriately perform a process of establishing a connection with the base station 10x. When a connection is established between the base station 10x and the mobile terminal 40x, the mobile terminal 40x uses a connection generated in the connection process, and conducts a communication with the base station 10x.

FIG. 25 illustrates an example of a method of changing a timing for transmitting a notification signal. In addition to the communication process illustrated in FIG. 24, each base station 10 can be modified so that it randomly changes a timing for transmitting a notification signal in a control slot.

In the example illustrated in FIG. 25, STc1 through STc3 are control slots. It is assumed that send1 through send3 represent timings for transmitting notification signals. In STc1, while the base station 10 transmits a notification signal upon the start of a control slot, a notification signal is transmitted at a middle point in a control slot in STc2. Further, in STc3, a notification signal is transmitted at a timing that is later than the timing for transmitting a notification signal in STc1 and earlier than the timing for transmitting a notification signal in STc2.

By shifting timings for transmitting notification signals randomly in control slots as described above, it is possible to reduce interference between notification signals. Also, because the mobile terminal 40 can perform a process by using information obtained through a notification signal even when a communication is not established with the base station, emergency data can be processed promptly provided that interference between notification signals can be avoided.

As described above, it is possible for a terminal device to obtain data from a base station at an early stage.

<Others>

While explanations have been given to an exemplary case where the mobile terminal 40 performs a process of transmitting a packet for making a request to a base station for a communication, an arbitrary communication terminal device that establishes and terminates a connection with a base station can perform a process similar to that performed by the mobile terminal 40.

While explanations have been given for an exemplary case where the second and third embodiments are combined as a variation example, the first through fourth embodiments can be used in an arbitrary combination in accordance with the implementation.

It is assumed that thresholds used by base stations and mobile terminals 40, the lengths of the first through third periods, etc., are set in accordance with the implementations.

While explanations have been given for an exemplary case where the mobile terminal 40 transmits packets for starting communications with the base stations 10 at constant intervals, the transmission intervals can be changed. In such a case, by using a pattern of changes of transmission intervals, a time taken to receive a packet in a base station, etc., the number of times of continuous transmission N is determined in such a manner that one or more packets are transmitted in one control slot.

In the above, explanations have been given for an exemplary case where data communication slots and control slots are arranged alternately in order to facilitate understanding, the arrangement of time slots in a superframe can be changed in accordance with the implementation. The number of times of continuous transmission N is determined by the process illustrated in FIG. 7 and other figures by using the arrangement of data communication slots and control slots in a superframe.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A base station apparatus comprising:
   a processor configured to set a waiting period in which a packet from a terminal device to which a connection has not been established is awaited and to set a data communication slot;
   a memory configured to store data that is processed by the terminal device to which a connection is established; and
   a communication circuit configured to, upon receiving a first packet from the terminal device in the waiting period, transmit to the terminal device a second packet containing the data and information used by the terminal device for establishing a connection used for conducting a communication using the data communication slot, the data being transmitted to the terminal device by the second packet before the establishing of the connection,
   wherein
   the memory stores identification information for identifying the terminal device that is predicted to be connected to the base station apparatus as a predicted identification information, and
   the processor further determines a timing for transmitting the second packet in such a manner that a certain time period is shorter than another time period, the certain time period being between reception of the first packet and transmission of the second packet to the terminal device in a case when the identification information of the first packet matches the predicted identification information, the another time period being between reception of the first packet and transmission of the second packet to the terminal device in a case when the identification information of the first packet does not match the predicted identification information.

2. The base station apparatus according to claim 1, wherein the processor
   determines a first period, a second period, and a third period separately from the waiting period during which the first packet is included in transmitted packets transmitted by the terminal device for establishing the connection, the first period starting after reception of a last packet among the transmitted packets, the second period starting at a time when the first period ends, and the third period starting at a time when the second period ends,
   determines a timing for transmitting the second packet to be in the waiting period in the first period when the identification information of the first packet matches the predicted identification information,
   determines a timing for transmitting the second packet to be in the waiting period in the second period when the identification information of the first packet does not match the predicted identification information and a reception power strength upon receiving the first packet exceeds a threshold, and
   determines a timing for transmitting the second packet to be in the waiting period in the third period when the identification information of the first packet does not match the predicted identification information and the reception power strength is equal to or smaller than the threshold.

3. The base station apparatus according to claim 1, wherein the processor obtains, from the first packet, a sequence number, which represents an order in which the first packet was transmitted among packets transmitted by the terminal device for establishing a connection, wherein the memory further stores a transmission number of packets determined so that the terminal device is enabled to transmit at least one packet in the waiting time and a cycle in which the terminal device transmits packets, and the processor causes the second packet to be transmitted when transmission from the terminal device is terminated by determining a timing for transmitting the second packet so that the second packet is transmitted at or after a time when a time obtained by a product of a difference value and the cycle has elapsed since a reception time of the first packet, and the difference value is a difference between the sequence number and the transmission number of packets.

4. The base station apparatus according to claim 1, wherein the communication circuit transmits the second packet when another packet is not received from the terminal device before a prescribed period has elapsed since reception of the first packet.

5. A base station apparatus comprising:

a processor configured to set a waiting period in which a packet from a terminal device to which a connection has not been established is awaited and to set a data communication slot;

a memory configured to store data that is processed by the terminal device to which a connection is established; and a communication circuit configured to, upon receiving a first packet from the terminal device in the waiting period, transmit to the terminal device a second packet containing the data and information used by the terminal device for establishing a connection used for conducting a communication using the data communication slot, the data being transmitted to the terminal device by the second packet before the establishing of the connection, wherein the processor:

shortens the waiting period when a number of communication devices including the terminal device that are connected exceeds a first threshold or a number of packets transmitted or received per unit time exceeds a second threshold, and extends a communication period for conducting communications with communication devices that are connected, for a length by which the waiting period is shortened.

6. A wireless communication system comprising
a terminal device;
a base station configured to store data that is processed by the terminal device as a connection destination, to set a waiting period in which a packet from the terminal device to which a connection has not been established is awaited and to set a data communication slot so as to conduct a communication; and wherein the terminal device is configured to:
attempt to establish a connection to the base station, transmit a prescribed number of packets that is determined so that at least one packet is transmitted in the waiting period, and the base station, upon receiving a first packet included in the prescribed number of packets from the terminal device in the waiting period, transmits a second packet containing the data and information used by the terminal device for establishing a connection used for conducting a communication using the data communication slot to the base station, the data being transmitted to the terminal device by the second packet before the establishment of the connection, wherein the wireless communication system further comprises a different base station that does not store information of the terminal device as being predicted to be a communication destination, wherein, the base station includes a storage unit that stores identification information for identifying the terminal device as information for identifying a device predicted to be connected to the base station, the base station transmits the second packet to the terminal device in a prescribed period after receiving the first packet, the different base station, upon receiving the first packet, transmits to the terminal device a third packet containing data that is held by the different base station after the prescribed period has elapsed since a time when the different base station received the first packet, and the terminal device performs a process by using data that was reported by the second packet when the terminal device received the second packet earlier than the third packet.

7. The wireless communication system according to claim 6, wherein the different base station further includes a measurement unit that measures a reception power that the different base station receives, and the difference base station transmits the third packet in a first period, which starts at a time when the prescribed period has elapsed since a time when the different base station received the first packet, when a reception power strength upon receiving the first packet exceeds a threshold, and transmits the third packet in a second period, which starts at a time when the first period ends, when a reception power strength upon receiving the first packet is equal to or smaller than the threshold.

8. A communication method causing a base station, comprising a memory which stores computer programming instructions which are executed by the base station and data that is processed by a terminal device to which a connection is established, to execute a process comprising:

setting, by at least one processor, a waiting period in which a packet from the terminal device to which a connection has not been established is awaited and setting a data communication slot; and transmitting, by the at least one processor, upon receiving a first packet from the terminal device in the waiting period, to the terminal device a second packet containing the data and information used by the terminal device for establishing a connection used for conducting a communication using the data communication slot, the data being transmitted to the terminal device by the second packet before the establishing of the connection, wherein the base station further executes a process including:

reading, from a memory included in the base station, identification information for identifying the terminal device that is predicted to be connected to the base station as a predicted identification information, and determining a timing for transmitting the second packet in such a manner that a certain time period is shorter than another time period, the certain time period being between reception of the first packet and transmission of the second packet to the terminal device in a case when the identification information of the first packet matches the predicted identification information, the another time period being between reception of the first packet and transmission of the second packet to the terminal device in a case when the identification information of the first packet does not match the predicted identification information.

9. The communication method according to claim 8, wherein the base station:

determines a first period, a second period, and a third period separately from the waiting period during which the first packet is included in transmitted packets transmitted by the terminal device for establishing the connection, the first period starting after reception of a last packet among the transmitted packets, the second period starting at a time when the first period ends, and the third period starting at a time when the second period ends, determines a timing for transmitting the second packet to be in the waiting period in the first period when the identification information of the first packet matches the predicted identification information, determines a timing for transmitting the second packet to be in the waiting period in the second period when the identification information of the first packet does not match the predicted identification information and a reception power strength upon receiving the first packet exceeds a threshold, and determines a timing for transmitting the second packet to be in the waiting period in the third period when the identification information of the first packet does not match the predicted identification information and the reception power strength is equal to or smaller than the threshold.

10. A communication method causing a base station, comprising a memory which stores computer programming instructions which are executed by the base station and data that is processed by a terminal device to which a connection is established, to execute a process comprising:

setting, by at least one processor, a waiting period in which a packet from the terminal device to which a connection has not been established is awaited and setting a data communication slot; and transmitting, by the at least one processor, upon receiving a first packet from the terminal device in the waiting period, to the terminal device a second packet containing the data and information used by the terminal device for establishing a connection used for conducting a communication using the data communication slot, the data being transmitted to the terminal device by the second packet before the establishing of the connection, wherein the at least one processor of base station:

reads, from the memory, a transmission number of packets determined so that the terminal device can transmit at least one packet in the waiting time and a cycle in which the terminal device transmits the packets, obtains, from the first packet, a sequence number, which represents an order in which the first packet was transmitted among packets transmitted by the terminal device for establishing a connection, causes the second packet to be transmitted when transmission from the terminal device is terminated by determining a timing for transmitting the second packet so that the second packet is transmitted at or after a time when a time obtained by a product of a difference value and the cycle has elapsed since a reception time of the first packet, and the difference value is a difference between the sequence number and the transmission number of packets.

11. A communication method causing a base station, comprising a memory which stores computer programming instructions which are executed by the base station and data that is processed by a terminal device to which a connection is established, to execute a process comprising:

setting, by at least one processor, a waiting period in which a packet from the terminal device to which a connection has not been established is awaited and setting a data communication slot; and transmitting, by the at least one processor, upon receiving a first packet from the terminal device in the waiting period, to the terminal device a second packet containing the data and information used by the terminal device for establishing a connection used for conducting a communication using the data communication slot, the data being transmitted to the terminal device by the second packet before the establishing of the connection, wherein the base station:

shortens the waiting period when a number of communication devices that are connected exceeds a first threshold or a number of packets transmitted or received per unit time exceeds a second threshold, and extends a communication period for conducting communications with communication devices that are connected, for a length by which the waiting period is shortened.

* * * * *